US012761326B2

(12) United States Patent
Onda et al.

(10) Patent No.: US 12,761,326 B2
(45) Date of Patent: Oct. 13, 2026

(54) LIGHT DETECTING DEVICE

(71) Applicant: DENSO CORPORATION, Kariya-city (JP)

(72) Inventors: Kazuhisa Onda, Kariya-city (JP); Sakito Miki, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 560 days.

(21) Appl. No.: 18/456,618

(22) Filed: Aug. 28, 2023

(65) Prior Publication Data

US 2023/0400556 A1 Dec. 14, 2023

Related U.S. Application Data

(63) Continuation of application No. PCT/JP2022/003483, filed on Jan. 31, 2022.

(30) Foreign Application Priority Data

Mar. 11, 2021 (JP) ................................ 2021-039564

(51) Int. Cl.
*G01C 3/08* (2006.01)
*G01S 7/481* (2006.01)

(52) U.S. Cl.
CPC .......... *G01S 7/4816* (2013.01); *G01S 7/4817* (2013.01)

(58) Field of Classification Search
CPC ............................ G01S 7/4816; G01S 7/4817
See application file for complete search history.

(56) References Cited

U.S. PATENT DOCUMENTS

| | | | | |
|---|---|---|---|---|
| 2006/0262290 | A1* | 11/2006 | Yamaguchi | G01S 7/4912 359/850 |
| 2020/0191821 | A1* | 6/2020 | Rondeau | G01S 7/4812 |
| 2020/0355805 | A1 | 11/2020 | Suzuki | |
| 2020/0386876 | A1* | 12/2020 | Kudla | G01S 7/4972 |
| 2022/0026206 | A1* | 1/2022 | Yuasa | G01C 15/002 |

FOREIGN PATENT DOCUMENTS

| | | | | |
|---|---|---|---|---|
| CN | 209858727 | U * | 12/2019 | G01S 7/481 |
| JP | H06-074763 | A | 3/1994 | |
| JP | 2001-218106 | A | 8/2001 | |
| JP | 2017-125765 | A | 7/2017 | |
| JP | 2019-110236 | A | 7/2019 | |

* cited by examiner

*Primary Examiner* — Mark Hellner
(74) *Attorney, Agent, or Firm* — Posz Law Group, PLC

(57) ABSTRACT

A light detecting device includes a reception optical system that guides a reflected beam along a reception optical axis and a light receiver that outputs a detection signal by receiving the reflected beam. The light receiver forms a reception surface having a reception aspect ratio in which a long side extends along a first reference axis orthogonal to the reception optical axis. The reception surface is inclined around the first reference axis with respect to a second reference axis orthogonal to the reception optical axis and the first reference axis.

9 Claims, 21 Drawing Sheets

LIGHT DETECTING DEVICE

CROSS REFERENCE TO RELATED APPLICATIONS

The present application is a continuation application of International Patent Application No. PCT/JP2022/003483 filed on Jan. 31, 2022, which designated the U.S. and claims the benefit of priority from Japanese Patent Application No. 2021-39564 filed on Mar. 11, 2021. The entire disclosures of all of the above applications are incorporated herein by reference.

TECHNICAL FIELD

The present disclosure relates to a light detecting device.

BACKGROUND

A light detecting device scans a projection beam toward an external detection area and detects a reflected beam which is the projection beam reflected from the detection area. A detection signal is output when a reflected beam is guided by a lens and received by a light receiver.

SUMMARY

According to an aspect of the present disclosure, a light detecting device scans a projection beam toward an external detection area and detects a reflected beam from the detection area, and includes a reception optical system and a light receiver. The reception optical system guides the reflected beam along a reception optical axis. The light receiver is configured to output a detection signal by receiving a reflected beam through the reception optical system. The light receiver defines a reception surface having a reception aspect ratio in which a long side extends along a first reference axis orthogonal to the reception optical axis.

DETAILED DESCRIPTION

Figure 1:
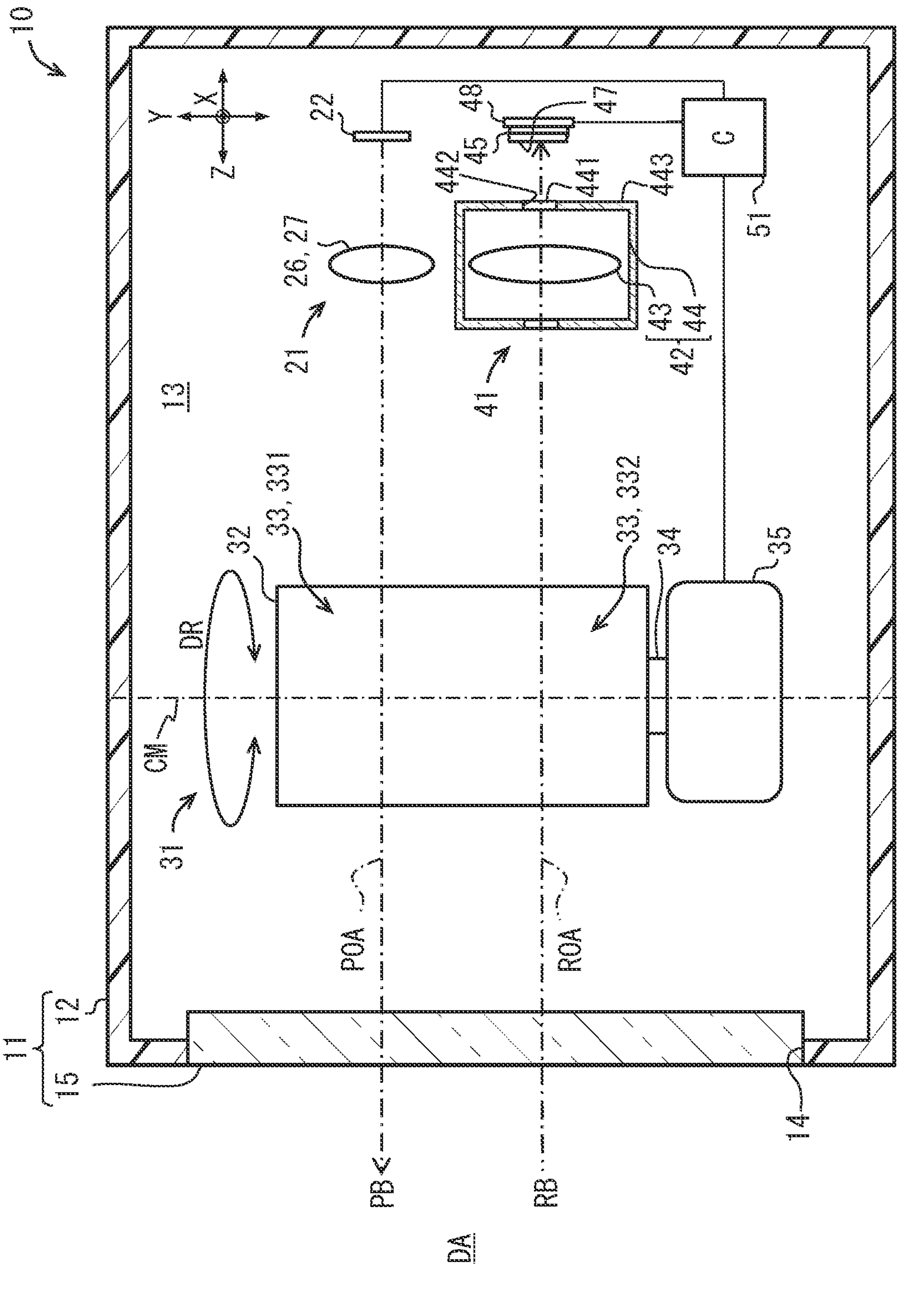
FIG. 1 is a schematic diagram illustrating a light detecting device according to a first embodiment.

A light detecting device scans a projection beam toward an external detection area and detects a reflected beam from the detection area. For example, a detection signal is output when a reflected beam is guided by a lens and received by a light receiver.

The reception surface of the light receiver has an aspect ratio which is designed so as to suppress erroneous detection due to stray light, with respect to a scanning direction of the projection beam by the scanning mirror. However, in case where the reception surface is disposed perpendicular to a reception optical axis of the lens that guides the reflected beam, if retroreflection of the reflected beam occurs, the retroreflection component of the reflected beam is guided to the detection area along the reception optical axis. In this case, when the retroreflection component of the reflected beam is further reflected and returns to the reception surface, a ghost may occur to cause erroneous detection, depending on a reflectance of a target existing in the detection area.

The present disclosure provides a light detecting device that ensures detection accuracy.

Hereinafter, technical means of the present disclosure will be described.

According to a first aspect of the present disclosure, a light detecting device is configured to scan a projection beam toward an external detection area and detect a reflected beam from the detection area, and includes: a reception optical system configured to guide the reflected beam along a reception optical axis; and a light receiver configured to output a detection signal by receiving the reflected beam focused by the reception optical system. The light receiver forms a reception surface having a reception aspect ratio in which a long side extends along a first reference axis orthogonal to the reception optical axis. The reception surface is inclined around the first reference axis with respect to a second reference axis orthogonal to the reception optical axis and the first reference axis.

As described above, the reception surface of the light receiver has the reception aspect ratio in which the long side extends along the first reference axis orthogonal to the reception optical axis. Therefore, when retroreflection of the reflected beam occurs, it is possible to guide the retroreflection component of the reflected beam in a direction deviated from the reception optical axis, due to the reception surface inclined around the first reference axis with respect to the second reference axis. In addition, since the reception surface is inclined around the first reference axis along the long side of the reception aspect ratio, it is possible to suppress the image forming blur caused by the inclination in the short side direction of the reception aspect ratio intersecting the second reference axis.

Accordingly, it is possible to suppress occurrence of a ghost due to further reflection of a retroreflective component, and to suppress deterioration in detection resolution due to a configuration for suppressing the ghost, thereby ensuring detection accuracy.

According to a second aspect of the present disclosure, a light detecting device is configured to scan a projection beam toward an external detection area and detect a reflected beam from the detection area, and includes: a reception optical system configured to guide the reflected beam along a reception optical axis; a light receiver configured to output a detection signal by receiving the reflected beam focused by the reception optical system; and a reception prism configured to refract the reflected beam in front of the light receiver. The light receiver forms a reception surface having a reception aspect ratio in which a long side extends along a first reference axis orthogonal to the reception optical axis. The reception prism has an optical surface inclined around the first reference axis with respect to a second reference axis orthogonal to the reception optical axis and the first reference axis, and the optical surface is formed by at least one of an incident surface or an emission surface of the reception prism.

As described above, in the second aspect, the reception surface of the light receiver has the reception aspect ratio in which the long side extends along the first reference axis orthogonal to the reception optical axis. The incident surface and/or the emission surface of the reception prism that refracts the reflected beam at the front side of the light receiver forms the optical surface having a posture arrangement inclined around the first reference axis with respect to the second reference axis orthogonal to the reception optical axis and the first reference axis. Accordingly, when retroreflection of the reflected beam occurs on the reception surface, it is possible to guide the retroreflection component of the reflected beam in a direction deviated from the reception optical axis. In addition, according to the second aspect, since the optical surface of the reception prism is inclined around the first reference axis along the long side of the reception aspect ratio on the reception surface, it is possible to suppress the imaging blur caused by the inclination in the short side direction of the reception aspect ratio.

Accordingly, it is possible to suppress occurrence of a ghost due to further reflection of a retroreflective component, and to suppress deterioration in detection resolution due to a configuration for suppressing the ghost, thereby ensuring detection accuracy.

Hereinafter, embodiments will be described with reference to the drawings. In the following description, the same reference symbols are assigned to corresponding components in each embodiment in order to avoid repetitive descriptions. When only a part of the configuration is described in the respective embodiments, the configuration of the other embodiments described before may be applied to other parts of the configuration. Further, not only the combinations of the configurations explicitly specified in the description of each embodiment, but also the configurations of the multiple embodiments can be partially combined even if they are not explicitly specified unless there is a particular problem with the combinations.

First Embodiment

As illustrated in FIG. 1, a light detecting device 10 according to a first embodiment of the present disclosure includes a light detection and ranging/a laser imaging detection and ranging (LiDAR) device mounted on a vehicle which is a moving object. In the following description, unless otherwise noted, each direction indicated by front, rear, up, down, left, and right is defined with reference to a vehicle on a horizontal plane. The horizontal direction indicates a direction parallel to the horizontal plane, and the vertical direction indicates a direction perpendicular to the horizontal plane.

The light detecting device 10 is disposed at least one place such as front portion, left or right side portion, rear portion, or/and upper roof in the vehicle. The light detecting device 10 scans a projection beam PB toward a detection area DA, corresponding to the arrangement position, in an external field of the vehicle. The light detecting device 10 detects a reflected beam RB, which is the projection beam PB being reflected by a target object in the detection area DA. A light in a near infrared region, which is difficult to be visually recognized by a person, is selected as the projection beam PB that is to be the reflected beam RB.

The light detecting device 10 observes the target in the detection area DA by detecting the reflected beam RB. The observation of the target includes at least one of a distance from the light detecting device 10 to the target, a direction in which the target exists, and a reflection intensity of the reflected beam RB from the target. The target that is a representative observation target for the light detecting device 10 on the vehicle may be at least one of moving object such as a pedestrian, a cyclist, an animal other than a human, and another vehicle. The target that is a typical observation target in the light detecting device 10 applied to the vehicle may be at least one stationary object such as a guardrail, a road sign, a structure on the side of the road, and a falling object on the road.

For the light detecting device 10, a three-dimensional orthogonal coordinate system is defined by X axis, Y axis, and Z axis as three axes orthogonal to each other. In the light detecting device 10, the Y axis serving as a first reference axis is set along the vertical direction of the vehicle. The X axis serving as a second reference axis is set along the horizontal direction of the vehicle. In FIG. 1, a left side of a one-dot chain line along the Y axis (adjacent to a cover panel 15) actually shows a cross section perpendicular to a right side of the one-dot chain line (adjacent to a projection unit 21 and a reception unit 41).

The light detecting device 10 includes a housing 11, a projection unit 21, a scanning unit 31, a reception unit 41, and a controller 51. The housing 11 forms an exterior of the light detecting device 10. The housing 11 includes a light shielding case 12 and a cover panel 15.

The light shielding case 12 is formed of, for example, a synthetic resin or a metal having a light shielding property. The light shielding case 12 has a box shape as a whole. The light shielding case 12 is constructed by a single component or a combination of plural components. The light shielding case 12 defines a housing chamber 13 housing the projection unit 21, the scanning unit 31, the reception unit 41, and the controller 51. In the light shielding case 12, the housing chamber 13 is provided in common to the projection unit 21 and the reception unit 41. The light shielding case 12 has an optical window 14 which is open. The optical window 14 is also provided in common to the projection unit 21 and the reception unit 41.

The cover panel 15 is mainly formed of a base material such as a synthetic resin or glass having translucency in the near infrared region. The cover panel 15 may have a light-transmitting property in the near-infrared region and a light-shielding property in the visible region by, for example, coloring the base material, forming an optical thin film, or attaching a film to the surface of the base material. The cover panel 15 has a flat plate shape or a curved shape as a whole. The cover panel 15 entirely closes the optical window 14 so as to transmit both the projection beam PB and the reflected beam RB. Accordingly, both the projection beam PB and the reflected beam RB can reciprocate between the housing chamber 13 and the detection area DA, and it is possible to block intrusion of foreign matter into the housing 11.

The projection unit 21 includes a light projector 22 and a projection optical system 26. The light projector 22 emits laser light in a near infrared region to be the projection beam PB. The light projector 22 is disposed inside the housing 11 and is held by the light shielding case 12.

Figure 2:
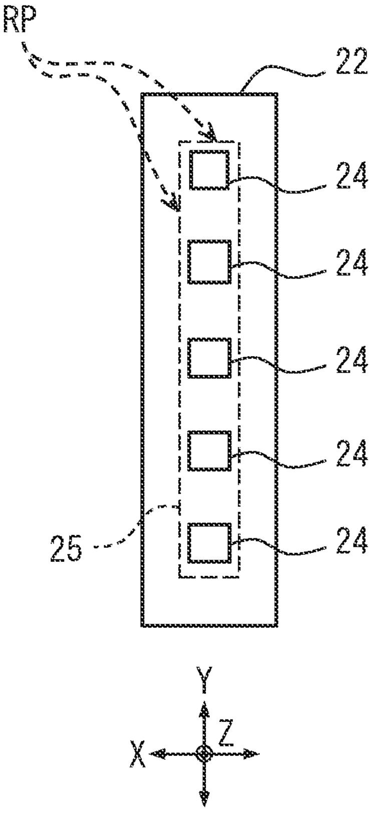
FIG. 2 is a schematic view illustrating a light projector according to the first embodiment.

As shown in FIG. 2, the light projector 22 is formed by arranging laser oscillation elements 24 in an array on a substrate. The laser oscillation elements 24 are arranged in a single row along the Y axis in the vertical direction of the vehicle. Each of the laser oscillation elements 24 emits coherent laser light in phase by a resonator structure and a mirror layer structure. The resonator structure resonates the laser light oscillated in the PN junction layer. The mirror layer structure repeatedly reflects the laser light with the PN junction layer interposed therebetween. Each of the laser oscillation elements 24 generates laser light in pulse, which is a part of the projection beam PB, in accordance with a control signal from the controller 51.

The light projector 22 has a projection window 25 defined with a pseudo rectangular contour, on one side of the substrate. The projection window 25 is configured as an assembly of laser oscillation openings of the laser oscillation elements 24. The projection aspect ratio RP, which is an aspect ratio of the projection window 25, is defined such that the long side extends along the Y axis and the short side extends along the X axis. That is, the projection aspect ratio RP is set along the Y axis which is a first reference axis and the X axis which is a second reference axis.

The laser light projected from the laser oscillation opening of each laser oscillation element 24 is projected from the projection window 25 as a projection beam PB assumed to be in a longitudinal line shape along the Y axis in the detection area DA shown in FIG. 1. The projection beam PB may include non-light-emitting portions corresponding to the arrangement interval of the laser oscillation elements 24 in a setting direction of the Y axis (hereinafter, referred to as Y direction). Even in this case, the non-light-emitting portion is macroscopically eliminated by the diffraction action, and the linear projection beam PB is formed in the detection area DA.

The projection optical system 26 projects the projection beam PB from the light projector 22 toward the scanning mirror 32 of the scanning unit 31. The projection optical system 26 is disposed between the light projector 22 and the scanning mirror 32 on the optical path of the projection beam PB.

The projection optical system 26 exerts at least one type of optical action among, for example, condensing, collimating, and shaping. The projection optical system 26 forms a projection optical axis POA along the Z axis. The projection optical system 26 includes at least one projection lens 27 held by the light shielding case 12. The projection lens 27 is formed mainly of a base material having translucency, such as a synthetic resin or glass, and has a lens shape corresponding to an optical action to be exhibited. The projection optical axis POA is defined as, for example, a virtual ray axis passing through the center of curvature of the lens surface in the projection lens 27. The principal ray of the projection beam PB emitted from the center of the projection window 25 is guided along the projection optical axis POA.

The scanning unit 31 includes the scanning mirror 32 and a scanning motor The scanning mirror 32 scans the projection beam PB projected from the projection optical system 26 of the projection unit 21 toward the detection area DA, and reflects the reflected beam RB from the detection area DA toward the reception optical system 42 of the reception unit 41. The scanning mirror 32 is disposed between the cover panel 15 and the projection optical system 26 on the optical path of the projection beam PB and between the cover panel 15 and the reception optical system 42 on the optical path of the reflected beam RB.

The scanning mirror 32 is formed mainly of a base material such as synthetic resin or glass. The scanning mirror 32 has a flat plate shape as a whole. In the scanning mirror 32, for example, a reflection film of aluminum, silver, gold, or the like is deposited on one side of the base material, so that a reflection surface 33 having a rectangular contour is formed as a mirror surface.

Figure 3:
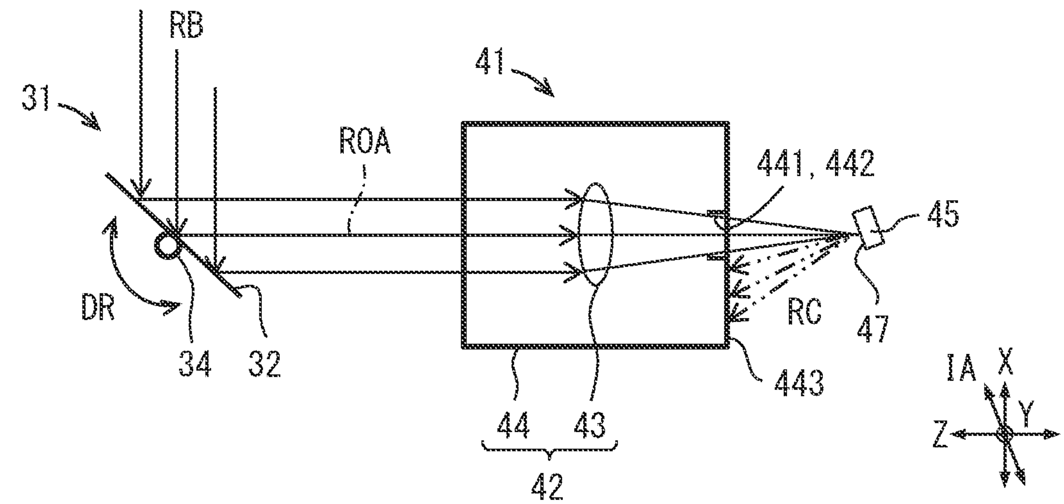
FIG. 3 is a schematic view illustrating a scanning unit and a reception unit according to the first embodiment.

As shown in FIGS. 1 and 3, the scanning mirror 32 has a rotation shaft 34 rotatably held by the light shielding case 12. The vertical direction of the vehicle in which the rotation center line CM of the rotation shaft 34 extends substantially coincides with the longitudinal direction of the reflection surface 33 as the Y direction. The scanning mirror 32 can adjust the normal direction of the reflection surface 33 around the rotation center line CM by rotating. The scanning mirror 32 swings within a finite drive range DR by, for example, a mechanical or electrical stopper. Accordingly, the projection beam PB reflected by the scanning mirror 32 is restricted so as not to deviate from the optical window 14.

As shown in FIG. 1, the scanning mirror 32 is provided in common to the projection unit 21 and the reception unit 41. That is, the scanning mirror 32 is provided in common to the projection beam PB and the reflected beam RB. Accordingly, the reflection surface 33 of the scanning mirror 32 has a projection reflecting portion 331 for projecting the projection beam PB and a reception reflecting portion 332 for receiving the reflected beam RB, which are arranged in the Y direction. The projection reflecting portion 331 and the reception reflecting portion 332 are provided at positions spaced apart from each other or at positions at least partially overlapping each other.

The projection beam PB is reflected by the projection reflecting portion 331, in which the normal direction is adjusted in accordance with the rotational driving of the scanning mirror 32, so as to temporally and spatially scan the detection area DA through the optical window 14. The scanning of the projection beam PB with respect to the detection area DA is substantially limited to the scanning in the horizontal direction in accordance with the rotation driving of the scanning mirror 32 around the rotation center line CM. Accordingly, the drive range DR of the scanning mirror 32 defines the horizontal angle of view in the detection area DA.

The projection beam PB is reflected by the target existing in the detection area DA, and becomes the reflected beam RB returning to the light detecting device 10. The reflected beam RB passes through the optical window 14 again and heads the reception reflecting portion 332 of the scanning mirror 32. The speeds of the projection beam PB and the reflected beam RB are sufficiently larger than the rotational speed of the scanning mirror 32. Accordingly, the reflected beam RB is reflected by the reception reflecting portion 332 in the scanning mirror 32 having substantially the same rotation angle as the projection beam PB, and is guided to the reception optical system 42 of the reception unit 41 so as to be opposite to the projection beam PB.

The scanning motor 35 is disposed around the scanning mirror 32 inside the housing 11. The scanning motor 35 is, for example, a voice coil motor, a brushed DC motor, or a stepping motor. The output shaft of the scanning motor 35 is coupled to the rotation shaft 34 of the scanning mirror 32 directly or indirectly via a drive mechanism such as a speed reducer. The scanning motor 35 is held by the light shielding case 12 so that the rotation shaft 34 can be rotationally driven together with the output shaft. The scanning motor 35 rotationally drives the rotation shaft 34 within the driving range DR in accordance with a control signal from the controller 51.

As shown in FIGS. 1 and 3, the reception unit 41 includes a reception optical system 42 and a light receiver 45. The reception optical system 42 guides the reflected beam RB reflected by the scanning mirror 32 toward the light receiver 45. The reception optical system 42 is positioned below the projection optical system 26 in the vertical direction of the vehicle along the Y axis.

The reception optical system 42 exerts an optical action so as to form an image of the reflected beam RB with respect to the light receiver 45. The reception optical system 42 forms a reception optical axis ROA along the Z axis. The reception optical system 42 includes at least one reception lens 43 held by the light shielding case 12 via a lens barrel 44. The reception lens 43 is mainly made of a base material having translucency, such as a synthetic resin or glass, and is formed in a lens shape (for example, see FIG. 3, FIG. 5 or the like) corresponding to an optical action to be exhibited. The reception optical axis ROA is defined as, for example, a virtual ray axis passing through the center of curvature of the lens surface in the reception lens 43.

Figure 4:
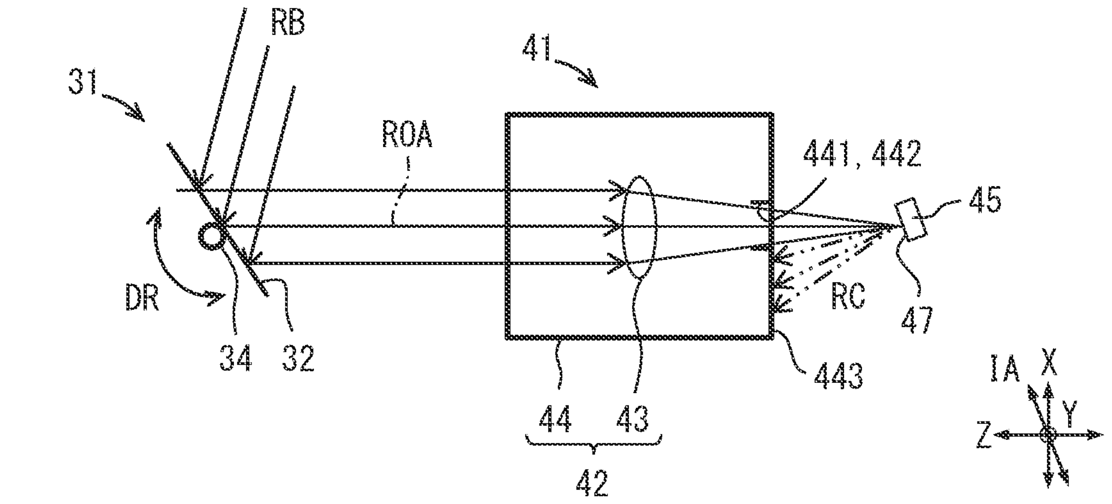
FIG. 4 is a schematic view illustrating a scanning unit and a reception unit according to the first embodiment.

As shown in FIGS. 3 and 4, the principal ray of the reflected beam RB reflected from the reception reflecting portion 332 of the scanning mirror 32 is guided along the reception optical axis ROA at an arbitrary rotation angle within the driving range DR. That is, the reception optical axis ROA is an optical axis along the reflected beam RB over the driving range DR of the scanning mirror 32.

As shown in FIGS. 1, 3, and 4, the reception optical system 42 includes the lens barrel 44 held by the light shielding case 12. The lens barrel 44 is mainly formed of a base material such as a synthetic resin or a metal having a light shielding property. The lens barrel 44 has a cylindrical shape as a whole. The lens barrel 44 houses and positions the reception lens 43.

Figure 5:
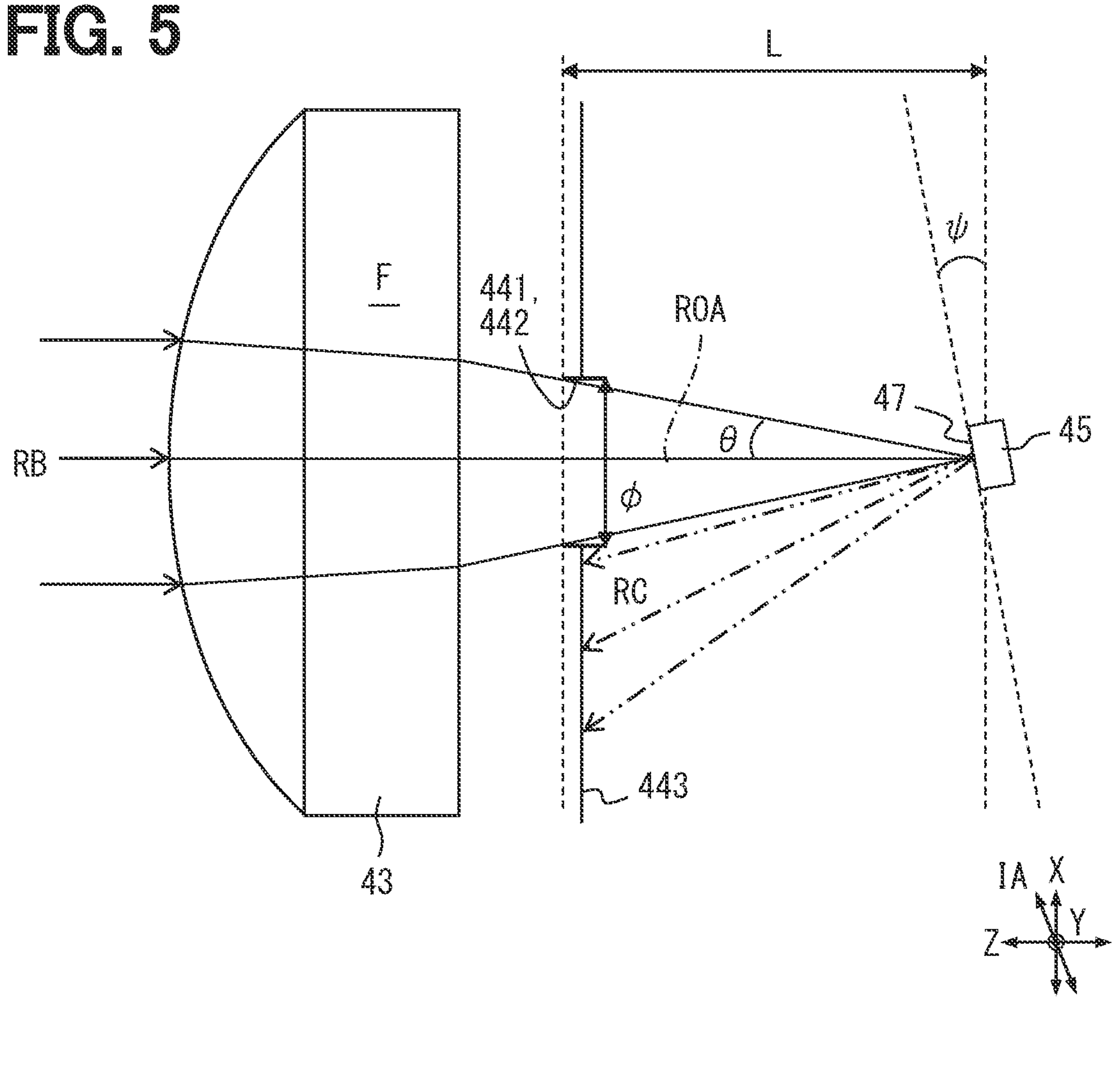
FIG. 5 is an enlarged schematic view illustrating the reception unit according to the first embodiment.

The light receiver 45 outputs a detection signal by receiving the reflected beam RB imaged by the reception optical system 42. The light receiver 45 is disposed inside the housing 11 and is held by the light shielding case 12. The light receiver 45 is positioned below the light projector 22 in the vertical direction of the vehicle along the Y axis and on the reception optical axis ROA. As shown in FIG. 5, the light receiver defines an inclined axis IA orthogonal to the Y axis and inclined at an acute angle to one side around the Y axis and at an obtuse angle to the opposite side around the Y axis with respect to the reception optical axis ROA (the Z axis) and the X axis.

Figure 6:
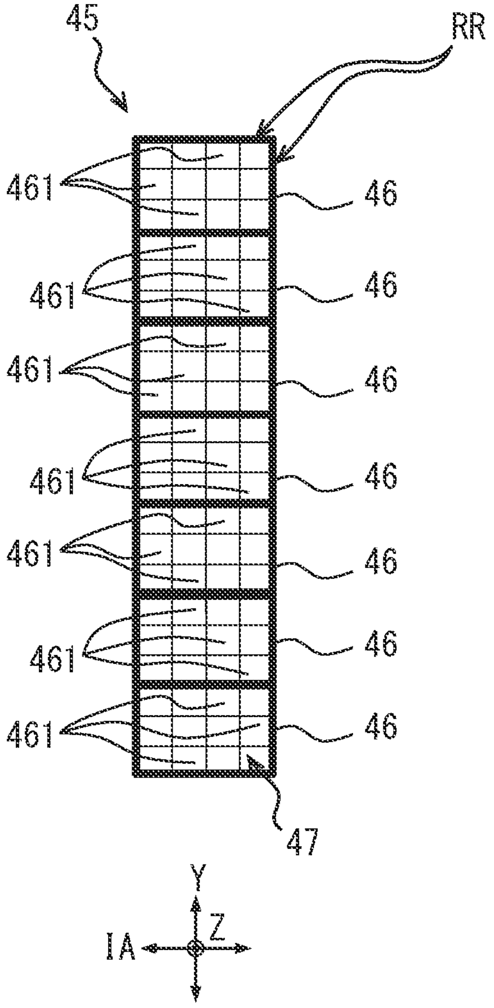
FIG. 6 is a schematic view illustrating a light receiver according to the first embodiment.

As indicated by a thick line in FIG. 6, the light receiver 45 has reception pixels 46 arranged in an array on a substrate. The reception pixels 46 are arranged in a single row along the Y axis in the vertical direction of the vehicle. As indicated by thin lines in FIG. 6, each reception pixel 46 includes reception elements 461. For each reception pixel 46, a predetermined number of reception elements 461 are arranged along each of the Y axis and the inclined axis IA. Since there are plural reception elements 461 for each reception pixel 46, the output value varies according to the number of responses. Therefore, it is possible to increase the dynamic range by bundling the reception elements 461 for each reception pixel 46 to output. The reception element 461 of the reception pixel 46 is constructed mainly of a photodiode such as a single photon avalanche diode (SPAD). The reception elements 461 of the reception pixel 46 may be integrally constructed by stacking microlens array in front of the photodiode array. In FIG. 6, some of the reference numerals assigned to the reception element 461 are omitted.

As shown in FIGS. 1 and 3 to 6, a reception surface 47 of the light receiver has a rectangular contour on one side of the substrate. The reception surface 47 is configured as an aggregate of incident surfaces of the reception pixels 46. The geometric center with respect to the rectangular contour of the reception surface 47 is aligned on the reception optical axis ROA or slightly offset from the reception optical axis ROA in the setting direction of the X axis (hereinafter, referred to as X direction). Each of the reception pixels 46 receives and detects the reflected beam RB incident on the incident surface of the reception surface 47 by the reception element 461.

The reception aspect ratio RR, which is an aspect ratio of the reception surface 47, is defined such that the long side extends along the Y axis and the short side extends along the inclined axis IA. That is, unlike the projection aspect ratio RP, the reception aspect ratio RR of the first embodiment is set along the Y axis which is a first reference axis, the X axis which is a second reference axis, and the inclined axis IA corresponding to the reception optical axis ROA. The reflected beam RB spreads in a line shape corresponding to the projection beam PB assumed to be in a line shape in the detection area DA.

As shown in FIG. 1, the light receiver 45 integrally includes a decoder 48. The decoder 48 sequentially reads out the electric pulses generated by the respective reception pixels 46 in response to the detection of the reflected beam RB by sampling processing. The decoder 48 outputs the sequentially read electric pulses as detection signals to the controller 51. When the sampling process is ended by reading the electric pulse, the detection for observing the target in the detection area DA is also ended.

The controller 51 controls observation of the target in the detection area DA. The controller 51 mainly includes at least one computer including a processor and a memory. The controller 51 is connected to the light projector 22, the scanning motor 35, and the light receiver 45. The controller 51 outputs a control signal to the light projector 22 so that the projection beam PB is generated by the oscillation of each laser oscillation element 24 at the light emission timing. The controller 51 outputs a control signal to the scanning motor 35 so as to control scanning and reflection by the scanning mirror 32 in synchronization with the light emission timing of the projection beam PB. The controller 51 generates observation data of the target in the detection area DA by performing arithmetic processing on the electric pulse output as the detection signal from the light receiver 45 in accordance with the light emission timing of the light projector 22 and the scanning and reflection by the scanning mirror 32. Next, a detailed configuration of the reception unit 41 will be described.

As shown in FIGS. 1 and 3 to 5, in the reception optical system 42 of the reception unit 41, the lens barrel 44 forms an aperture stop 442 that narrows the exit port 441 facing the light receiver 45. The aperture stop 442 provides the exit port 441 with a rectangular profile having an aspect ratio in which the long side is along the Y axis and the short side is along the X axis. The aperture dimension φ of the aperture stop 442, which is an internal dimension of the exit port 441, is set as small as possible while all of the reflected beams RB returning from the detection area DA can be emitted.

As shown in FIG. 5, the aperture dimension φ of the aperture stop 442 may be set according to the following Formula 1 in a cross section perpendicular to the Y axis and on the reception optical axis ROA. In Formula 1, L is a separation distance along the reception optical axis ROA from the incident end of the aperture stop 442 to the reception surface 47 of the light receiver 45. In Formula 1, θ is the maximum angle of a light beam incident from the single reception lens 43 or the last reception lens 43 of the reception lenses to the reception surface 47 via the incident end of the exit port 441 narrowed by the aperture stop 442, with respect to the reception optical axis ROA. In Formula 1, F is an F value set for the single reception lens 43 or a combined value of F values set for the reception lenses 43.

$$\varphi=2\cdot L\cdot\tan(\theta)=2\cdot L\cdot\tan(\sin-1(1/(2\cdot F))) \qquad \text{Formula 1}$$

As shown in FIGS. 1 and 3 to 5, in the reception optical system 42, the lens barrel 44 forms a light absorbing surface 443 around the exit port 441 facing the light receiver 45 (around the aperture stop 442). The light absorbing surface 443 is formed by, for example, a blackening treatment such as an alumite treatment, a plating treatment, or a painting treatment on the outer surface of the base material. The light absorbing surface 443 may be provided on the entire outer wall surface of the lens barrel 44 facing the light receiver 45 in the setting direction of the reception optical axis ROA, which is the setting direction of the Z axis (hereinafter, referred to as Z direction). As illustrated in FIGS. 3 to 5, when retroreflection of the reflected beam RB occurs on the reception surface 47 of the light receiver 45, the retroreflection component RC of the reflected beam RB can be absorbed by being incident on the light absorbing surface 443.

As shown in FIGS. 1 and 3 to 6, the substantially planar reception surface 47 of the light receiver 45 is disposed in a posture extending in the setting direction of the inclined axis IA and the Y direction. Accordingly, the posture of the reception surface 47 is inclined around the Y axis as a first reference axis along the long side of the reception aspect ratio RR extends, with respect to the X axis as a second reference axis intersecting the short side of the reception aspect ratio RR, which is the setting direction of the inclined axis IA. As shown in FIGS. 3 to 5, in the cross section perpendicular to the Y axis and on the reception optical axis ROA, either side of the reception surface 47 may be inclined to approach the reception optical axis ROA, of both sides through the reception optical axis ROA in the X direction.

Figure 7:
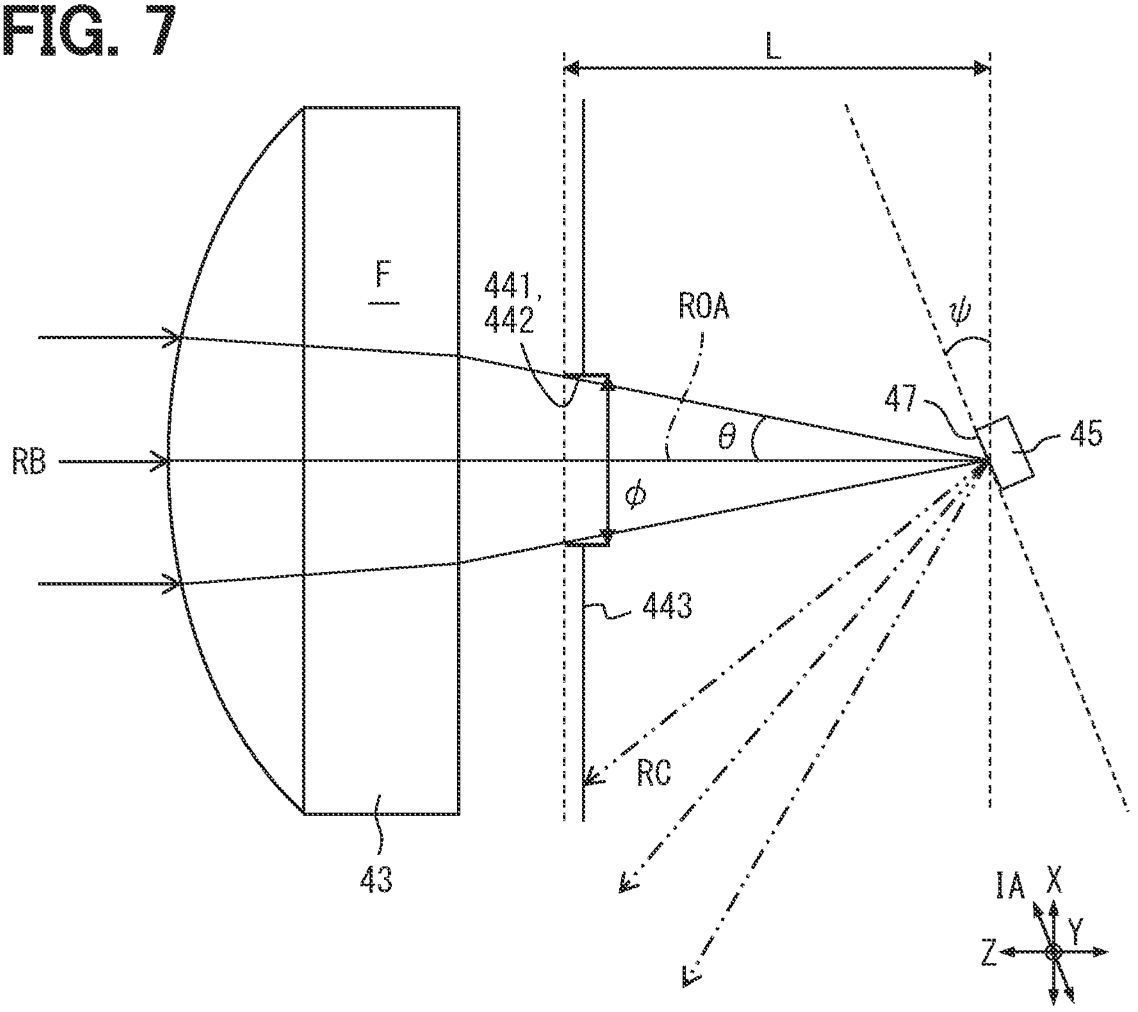
FIG. 7 is an enlarged schematic view illustrating the reception unit according to the first embodiment.

As shown in FIGS. 5 and 7, an inclination angle ψ of the reception surface 47 toward the reception optical axis ROA (counterclockwise direction in FIGS. 5 and 7) relative to the X axis is set to an acute angle such as a range equal to or greater than the maximum angle θ of Formula 1. The retroreflection component RC of the reflected beam RB on the reception surface 47 is likely to deviate from the reception optical axis ROA in accordance with an increase in the inclination angle ψ, whereas the imaging blur of the reflected beam RB on the reception surface 47 is less likely to occur particularly in the setting direction of the inclined axis IA (along the short side of the reception aspect ratio RR) in accordance with a decrease in the inclination angle ψ. Therefore, the inclination angle ψ may be set in accordance with a balance (that is, a trade-off) between the ease of deviation of the retroreflection component RC and the difficulty of occurrence of imaging blur.

The effects of the first embodiment will be described below.

In the first embodiment, the reception surface 47 of the light receiver 45 has the reception aspect ratio RR in which the long side extends along the Y axis as the first reference axis orthogonal to the reception optical axis ROA. Therefore, according to the first embodiment, in the reception surface 47 having the posture arrangement inclined around the Y axis with respect to the X axis as the second reference axis orthogonal to the reception optical axis ROA and the Y axis, even when the retroreflection of the reflected beam RB occurs, it is possible to guide the retroreflection component RC of the reflected beam RB in the direction deviated from the reception optical axis ROA, as illustrated in FIGS. 5 and 7. In addition, according to the first embodiment, since the reception surface 47 is inclined around the Y axis along the long side of the reception aspect ratio RR, it is possible to suppress the imaging blur caused by the inclination along the short side of the reception aspect ratio RR intersecting with the X axis.

According to the first embodiment, it is possible to suppress occurrence of a ghost due to further reflection of the retroreflective component RC, and to suppress deterioration in detection resolution due to the configuration for suppressing the ghost, thereby ensuring detection accuracy. In a case where a ghost occurs due to the retroreflection component RC, for example, a defect such as erroneous detection of a distance twice the actual distance to the target occurs. In contrast, in the light detecting device 10 of the first embodiment capable of suppressing erroneous detection by suppressing the occurrence of a ghost, it is possible to secure detection accuracy.

According to the first embodiment, the reception pixels 46 of the reception surface 47 are arranged in a single row in the Y direction along the long side of the reception aspect ratio RR. Accordingly, it is possible to reduce the spread of the reception surface 47 along the short side of the reception aspect ratio RR intersecting with the X axis. Therefore, it is possible to improve the effect of suppressing the deterioration of the detection resolution due to the imaging blur, and thus the detection accuracy.

According to the first embodiment, the scanning mirror 32 that scans the projection beam PB toward the detection area DA and reflects the reflected beam RB toward the reception optical system 42 is driven to rotate around the rotation center line CM along the Y axis. Therefore, when the reception optical system 42 guides the reflected beam RB along the reception optical axis ROA over the driving range DR of the scanning mirror 32, it is possible to improve the detection accuracy by suppressing the occurrence of the ghost and suppressing the deterioration of the detection resolution over the entire detection area DA scanned by the projection beam PB.

According to the first embodiment, the light projector 22 that emits the projection beam PB toward the scanning mirror 32 has the projection window 25. The projection window 25 has the projection aspect ratio RP such that the long side extends along the Y axis, similarly to the long side of the reception aspect ratio RR. Accordingly, it is possible to suppress the image forming blur on the reception surface 47 in the Y direction along the long side common to the reception aspect ratio RR and the projection aspect ratio RP. Therefore, it is possible to improve the effect of suppressing the deterioration of the detection resolution and the detection accuracy.

According to the first embodiment, the reception lens 43 of the reception optical system 42 forms an image of the reflected beam RB with respect to the light receiver 45. Accordingly, the retroreflection component RC of the reflected beam RB generated on the reception surface 47 can be restricted from being reflected by the reception lens 43. Therefore, it is possible to suppress the occurrence of flare due to the retroreflection component RC on the reception lens 43 and to improve the detection accuracy.

According to the first embodiment, in the reception optical system 42, the reception lens 43 is housed in the lens barrel 44. Accordingly, the retroreflection component RC of the reflected beam RB generated on the reception surface 47 can be restricted from being stray light due to reflection inside the light detecting device 10 (specifically, inside the housing 11) and travelling toward the detection area DA. Therefore, it is possible to suppress the occurrence of a ghost due to the stray light of the retroreflection component RC and to improve the detection accuracy.

According to the first embodiment, the exit port 441 facing the light receiver 45 in the lens barrel 44 is narrowed by the aperture stop 442. Accordingly, the retroreflection component RC of the reflected beam RB generated on the reception surface 47 can be restricted from being retroincident on the reception lens 43 by being incident on the lens barrel 44 and from being reflected on the inner wall surface by being incident on the lens barrel 44. Therefore, it is possible to suppress the occurrence of flare and clutter due to the incidence of the retroreflection component RC into the lens barrel 44 and to improve the detection accuracy.

According to the first embodiment, the retroreflection component RC of the reflected beam RB generated on the reception surface 47 can be absorbed by the light absorbing surface 443 around the exit port 441 facing the light receiver 45 in the lens barrel 44. Accordingly, it is possible to reduce the reflectance with respect to the retroreflection component RC incident on the outer wall surface of the lens barrel 44. Therefore, it is possible to suppress the occurrence of clutter due to the reflection of the retroreflection component RC on the outer wall surface of the lens barrel 44 and to improve the detection accuracy.

Second Embodiment

A second embodiment is a modification to the first embodiment.

As shown in FIGS. 8 to 11, a reception unit 2041 of the second embodiment has a light receiver 2045, and a reception surface 2047 of the light receiver 2045 is disposed in a posture substantially orthogonal to the reception optical axis ROA (the Z axis). Thus, the reception aspect ratio RR of the reception surface 2047 is defined by the Y axis which is a first reference axis and the X axis which is a second reference axis, similarly to the projection aspect ratio RP. That is, the reception surface 2047 of the second embodiment includes the reception pixels 46 arranged in a single row in the same manner as in the first embodiment, and spreads with the long side of the reception aspect ratio RR in the Y direction and the short side of the reception aspect ratio RR in the X direction.

Figure 8:
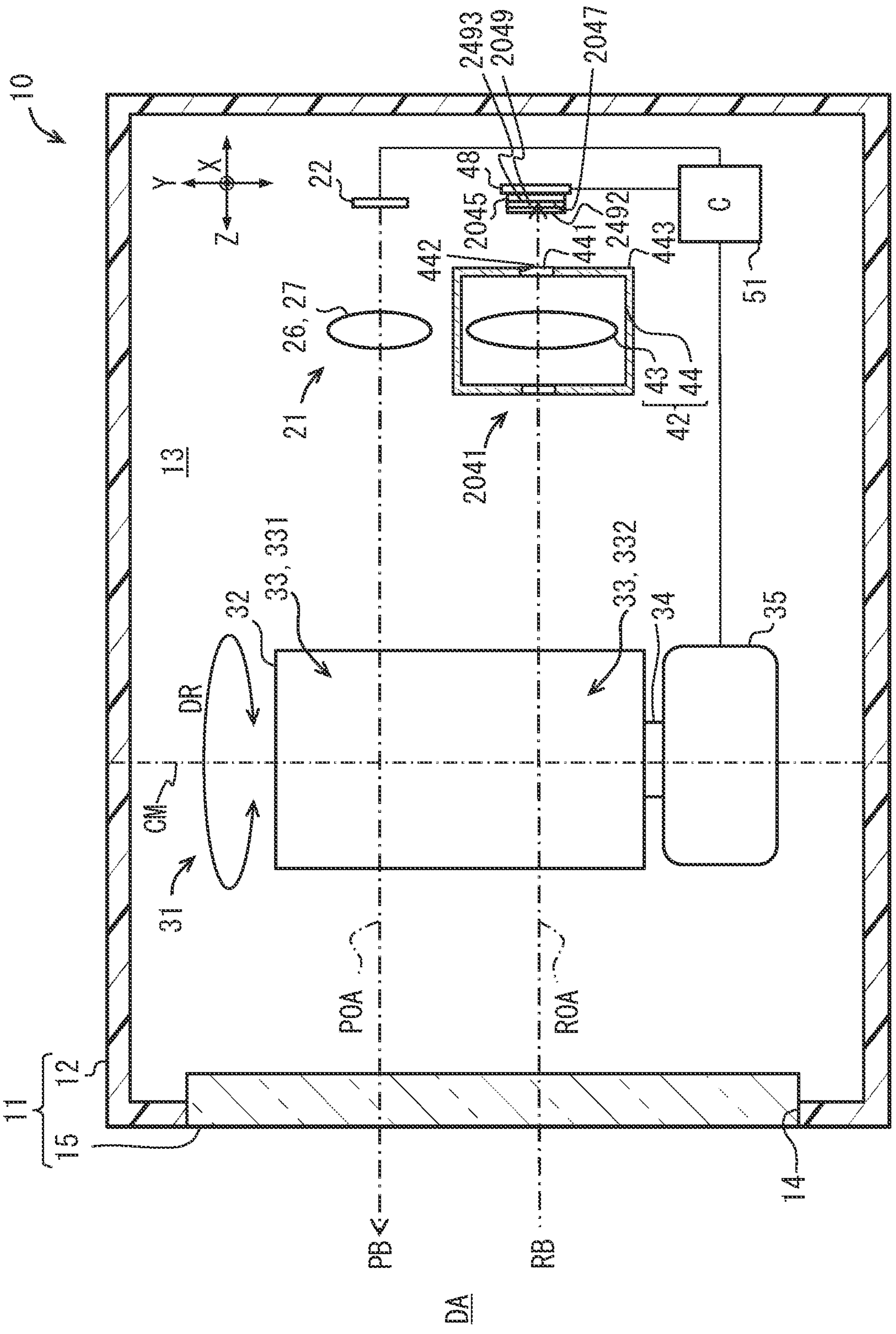
FIG. 8 is a schematic diagram illustrating a light detecting device according to a second embodiment.
Figure 9:
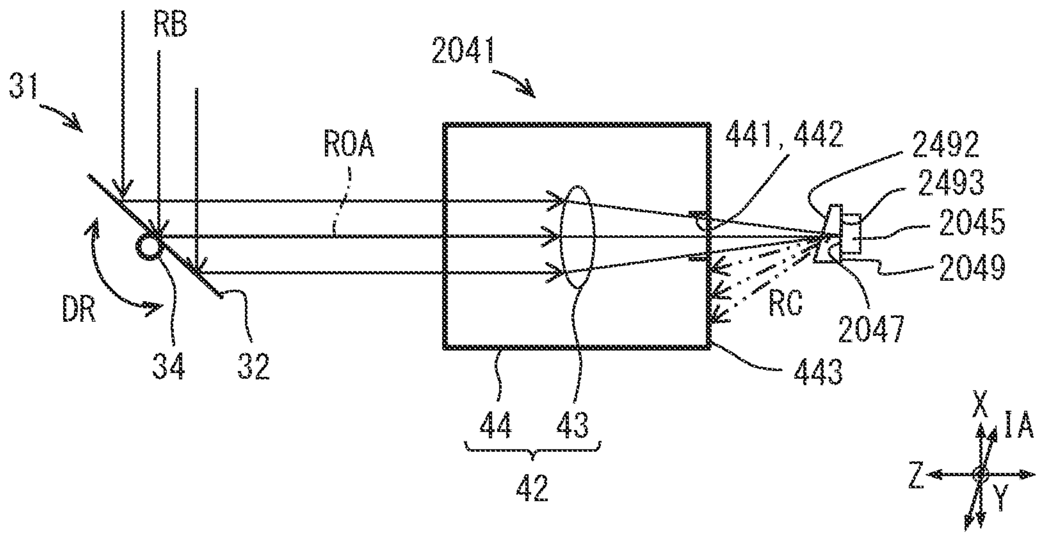
FIG. 9 is a schematic diagram illustrating a scanning unit and a reception unit according to the second embodiment.
Figure 10:
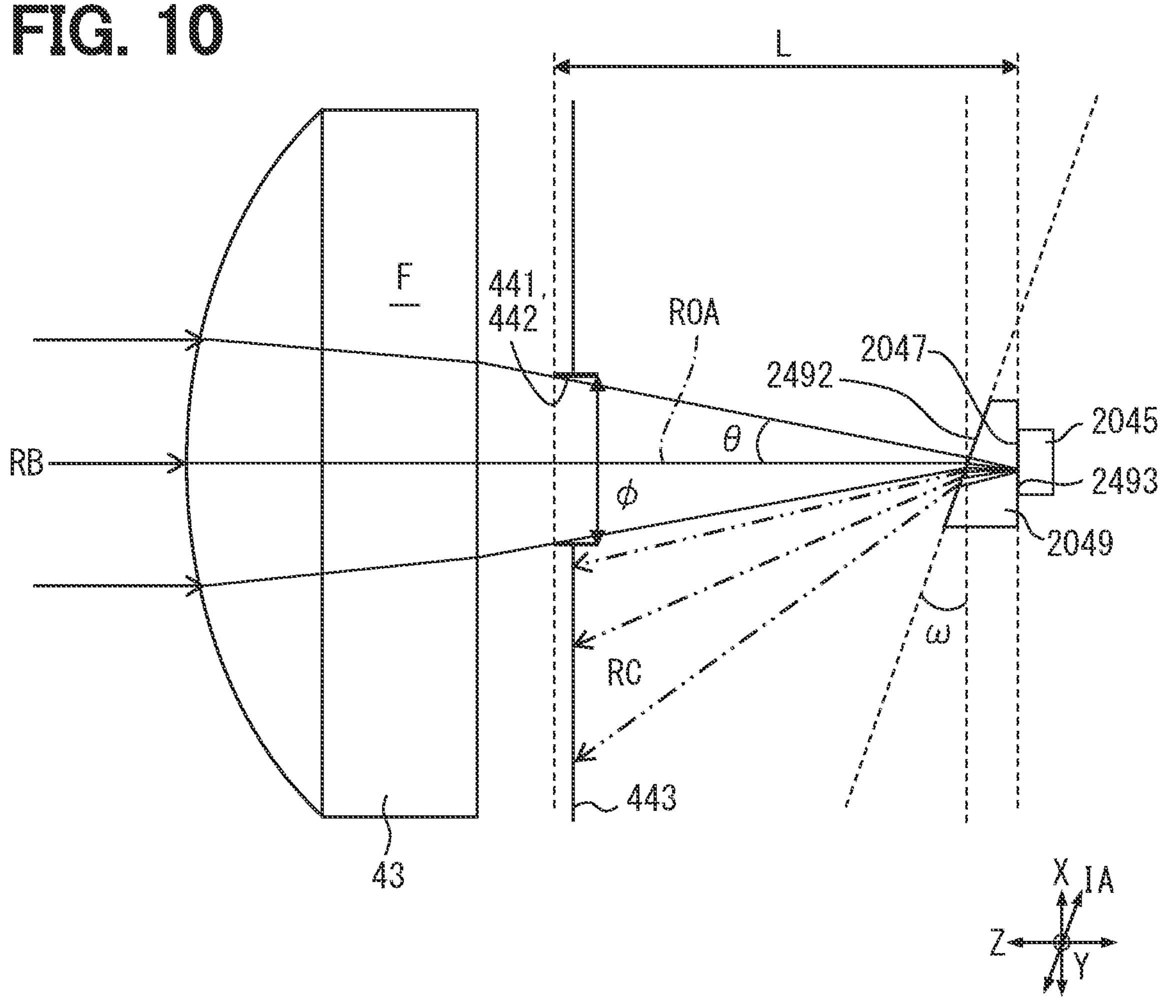
FIG. 10 is an enlarged schematic view illustrating the reception unit according to the second embodiment.
Figure 11:
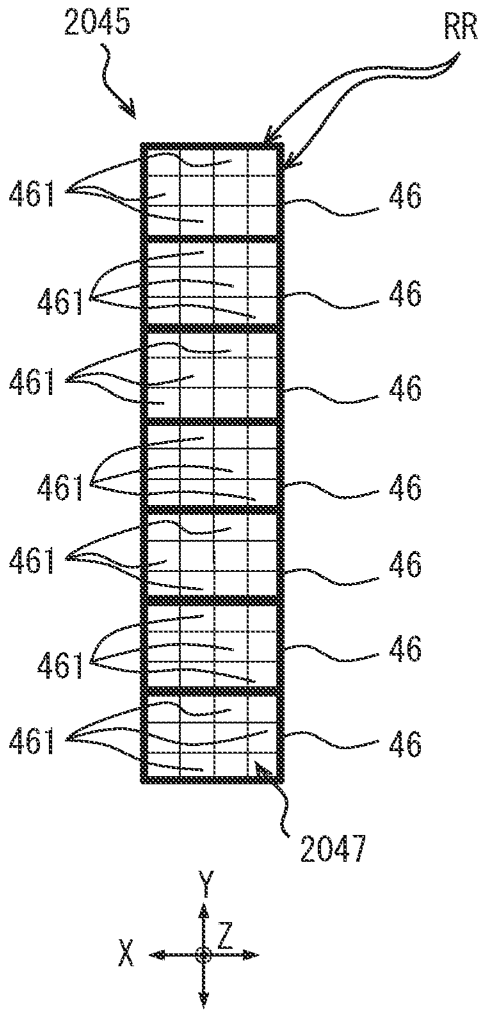
FIG. 11 is a schematic diagram illustrating a light receiver according to the second embodiment.

As shown in FIGS. 8 to 10, the reception unit 2041 of the second embodiment further includes a reception prism 2049. The reception prism 2049 is disposed inside the housing 11 and located between the exit port 441 of the reception optical system 42 and the reception surface 2047 of the light receiver 2045. The reception prism 2049 is held directly by the light shielding case 12 or indirectly via the light receiver 2045.

The reception prism 2049 refracts the reflected beam RB on the front side of the light receiver 2045. The reception prism 2049 is formed mainly of a base material having translucency, such as synthetic resin or glass. The reception prism 2049 has an incident surface 2492 and an emission surface 2493 which are non-parallel to each other with an acute angle interposed therebetween, as optical surface that exerts a refraction action on the reflected beam RB.

The incident surface 2492 faces the exit port 441 of the reception optical system 42 in the setting direction of the reception optical axis ROA (the Z direction). The incident surface 2492 may have, for example, a rectangular contour having an aspect ratio in which the long side extends along the Y axis while all of the reflected beams RB returning from the detection area DA can be incident and at least a part of the retroreflection component RC incident on the emission surface 2493 from the reception surface 2047 can be emitted. The emission surface 2493 faces the reception surface 2047 of the light receiver 2045 in the setting direction of the reception optical axis ROA. The emission surface 2493 may have, for example, a rectangular contour with an aspect ratio in which the long side extends along the Y axis while all of the reflected beams RB incident from the detection area DA to the incident surface 2492 can be emitted and at least a part of the retroreflection component RC from the reception surface 2047 can be incident.

In the reception prism 2049, the substantially planar incident surface 2492 is disposed in a posture extending in the setting direction of the inclined axis IA and the Y direction. As a result, the incident surface 2492 is inclined around the Y axis, as the first reference axis, along the long side of the reception aspect ratio RR, with respect to the X axis as the second reference axis, along the short side of the reception aspect ratio RR of the reception surface 2047, intersecting the inclined axis IA. As shown in FIGS. 9 and 10, in the cross section perpendicular to the Y axis and on the reception optical axis ROA, either side of the incident surface 2492 may be inclined to approach the reception optical axis ROA, of both sides through the reception optical axis ROA in the X direction.

Figure 12:
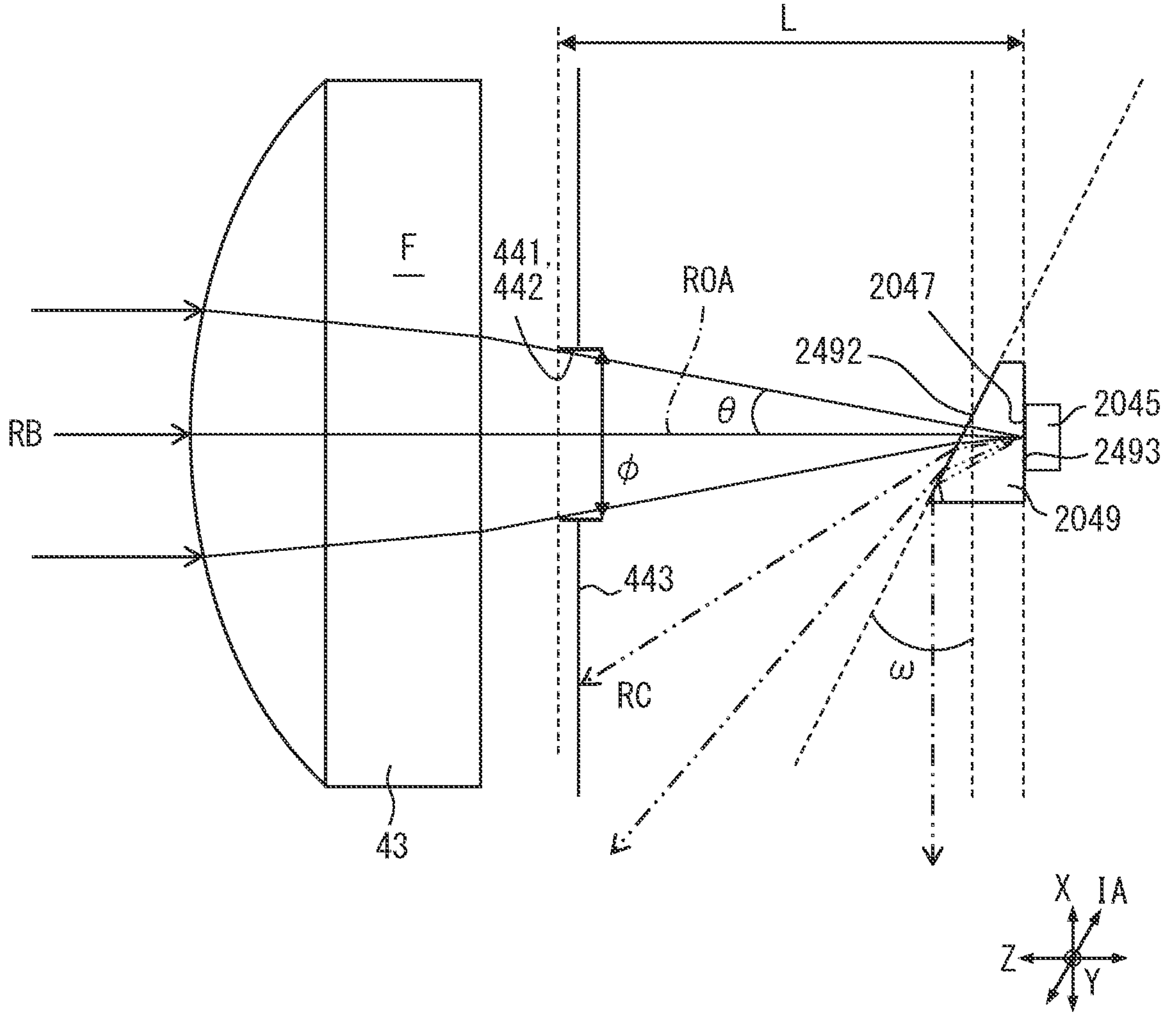
FIG. 12 is an enlarged schematic view illustrating the reception unit according to the second embodiment.

As shown in FIGS. 10 and 12, an inclination angle ω of the incident surface 2492 to approach the reception optical axis ROA (clockwise direction in FIGS. 10 and 12) from the X axis is set to an acute angle within a range equal to or larger than the maximum angle θ of Formula 1 defined in the first embodiment. As the inclination angle ω increases, the retroreflection component RC of the reflected beam RB on the reception surface 2047 is more likely to deviate from the reception optical axis ROA. As the inclination angle ω decreases, the imaging blur of the reflected beam RB on the reception surface 2047 is less likely to occur in the X direction (along the short side of the reception aspect ratio RR). Therefore, the inclination angle $\omega$ may be set in accordance with a balance (that is, a trade-off) between the ease of deviation of the retroreflection component RC and the difficulty of occurrence of imaging blur.

As shown in FIGS. 8 to 10, the substantially planar emission surface 2493 of the reception prism 2049 is disposed in a posture substantially orthogonal to the reception optical axis ROA (the Z axis). As a result, the emission surface 2493 spreads in the Y direction and the X direction in the same manner as the reception surface 2047. Therefore, the emission surface 2493 may be disposed to overlap the reception surface 2047. The emission surface 2493 may be disposed to overlap the reception surface 2047 directly or indirectly via a cover glass covering the reception surface 2047. The emission surface 2493 having such an overlapping arrangement may be integrated with the light receiver 2045 by, for example, being directly bonded to the reception surface by a translucent optical adhesive or being indirectly bonded to the reception surface 2047 via an optical adhesive and a cover glass of the reception surface 2047. The reception prism 2049 may be held directly by the light shielding case 12, which is a member different from the reception prism, or indirectly by the light shielding case 12 via a further member to maintain the arrangement posture in which the emission surface 2493 overlaps the reception surface 2047. The reception prism 2049 itself may constitute a cover glass of the reception surface 2047.

The effects of the second embodiment will be described below.

According to the second embodiment, the reception surface 2047 of the light receiver 2045 has the reception aspect ratio RR in which the long side extends along the Y axis as the first reference axis orthogonal to the reception optical axis ROA. The incident surface 2492 of the reception prism 2049 that refracts the reflected beam RB on the front side of the light receiver 2045 forms an optical surface having a posture arrangement inclined around the Y axis with respect to the X axis as the second reference axis orthogonal to the reception optical axis ROA and the Y axis. Accordingly, even when retroreflection of the reflected beam RB occurs on the reception surface 2047, it is possible to guide the retroreflection component of the reflected beam RB in a direction deviated from the reception optical axis ROA.

According to the second embodiment, since the incident surface 2492 of the reception prism 2049 is inclined around the Y axis along the long side of the reception aspect ratio RR in the reception surface 2047, it is possible to suppress the imaging blur caused by the inclination in the short side of the reception aspect ratio RR. Since the reception aspect ratio RR of the reception surface 2047 is set by the Y axis and the X axis, it is possible to suppress imaging blur in the short side of the reception aspect ratio RR along the X axis while facilitating mounting of the light receiver 2045.

According to the second embodiment, it is possible to suppress occurrence of a ghost due to further reflection of the retroreflection component RC, and to suppress deterioration in detection resolution due to the configuration for suppressing the ghost, thereby ensuring detection accuracy.

Further, in the second embodiment, the reception pixels 46 of the reception surface 2047 are arranged in a single row in the Y direction along the long side of the reception aspect ratio RR. Accordingly, it is possible to reduce the spread of the reception surface 2047 in the X direction along the short side of the reception aspect ratio RR. Therefore, it is possible to improve the effect of suppressing the deterioration of the detection resolution due to the imaging blur, and thus the detection accuracy.

Third Embodiment

The third embodiment is a modification in which the first embodiment and the second embodiment are combined.

Figure 13:
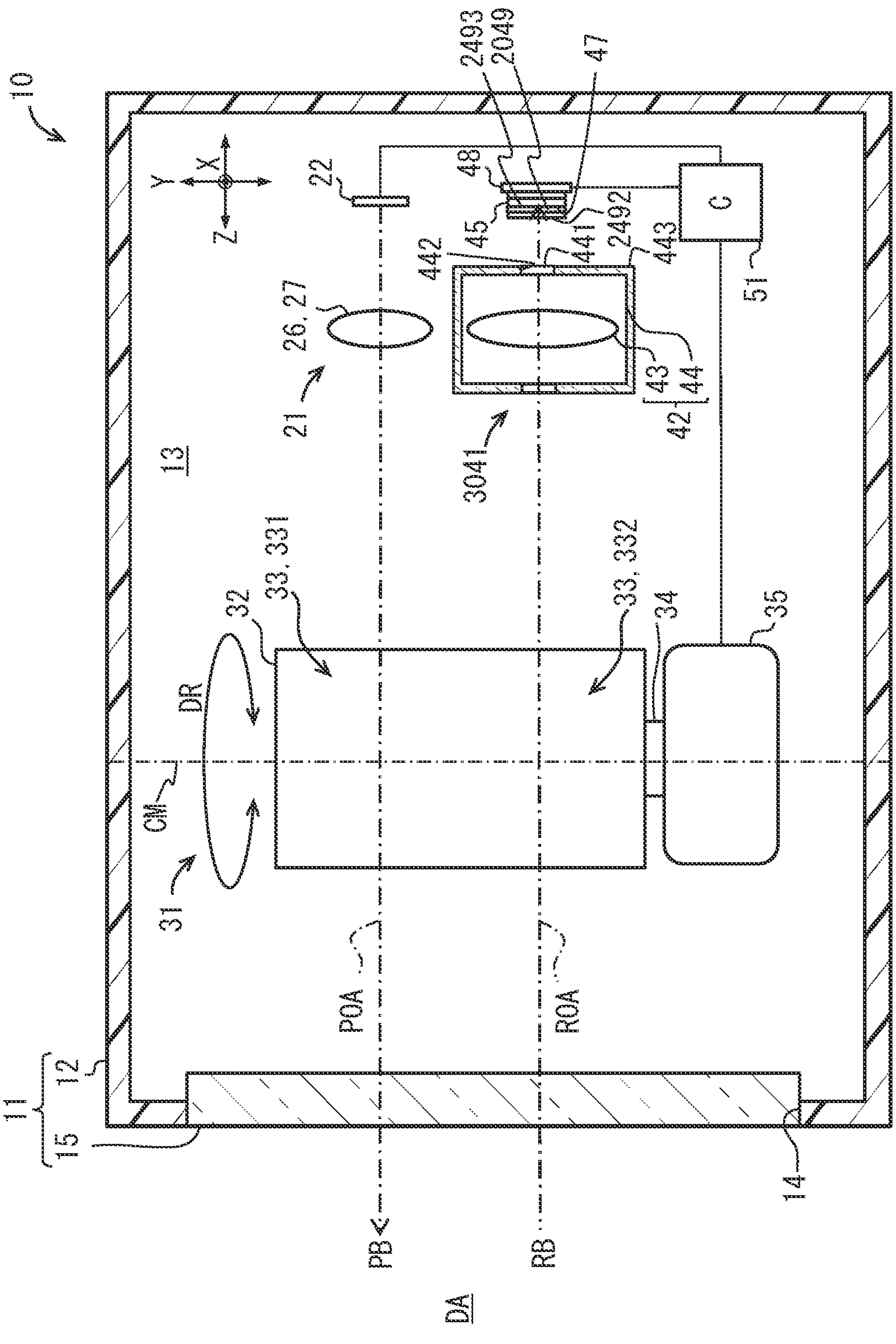
FIG. 13 is a schematic diagram illustrating a light detecting device according to a third embodiment.
Figure 14:
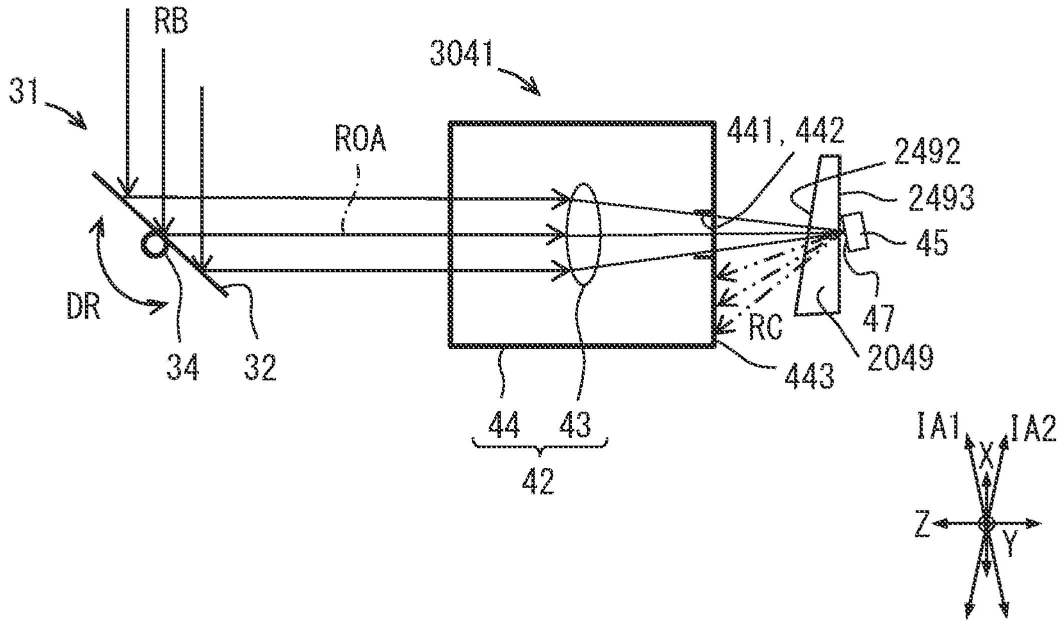
FIG. 14 is a schematic diagram illustrating a scanning unit and a reception unit according to the third embodiment.
Figure 15:
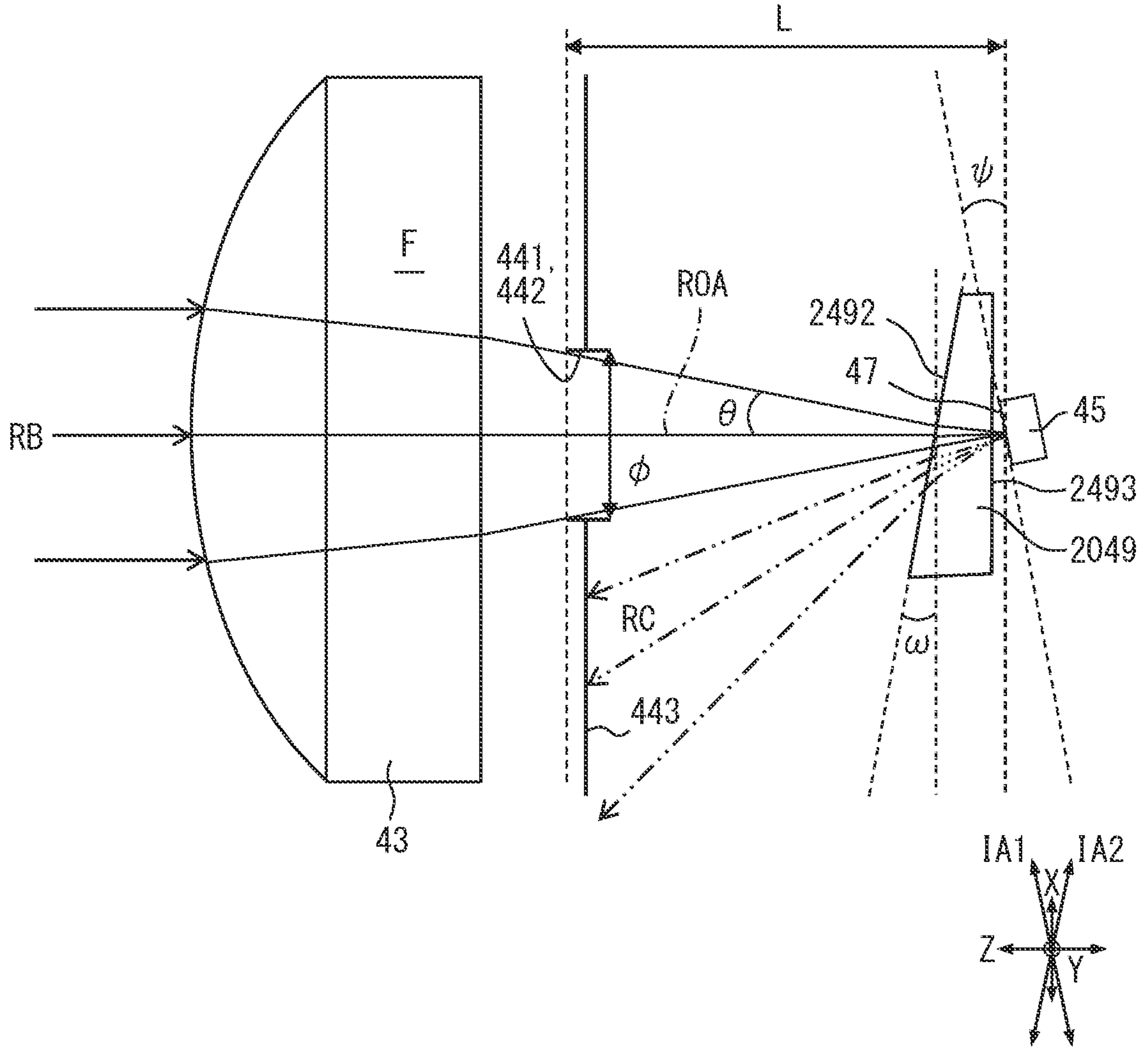
FIG. 15 is an enlarged schematic view illustrating a reception unit according to the third embodiment.
Figure 16:
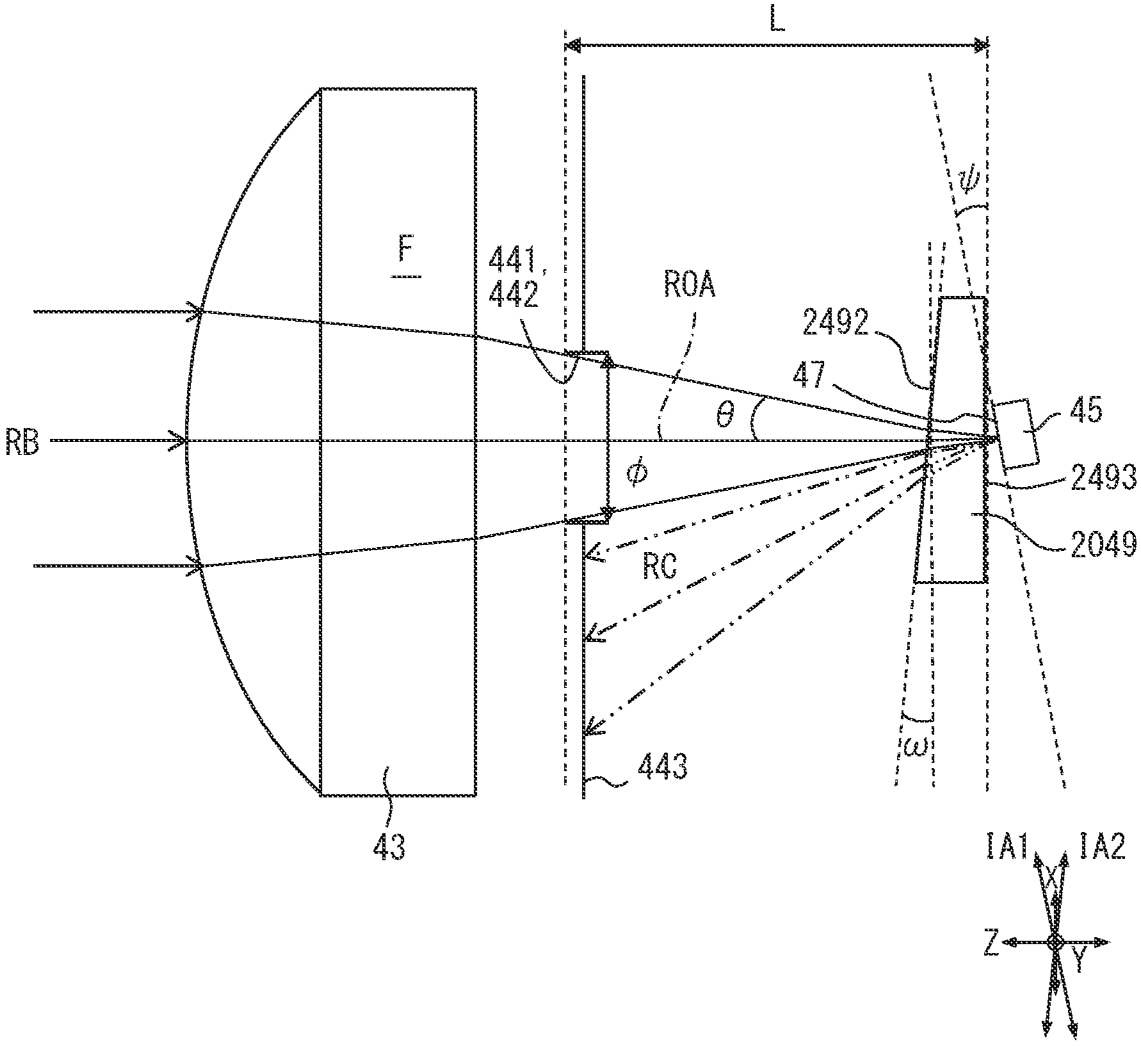
FIG. 16 is an enlarged schematic view illustrating a reception unit according to the third embodiment.
Figure 17:
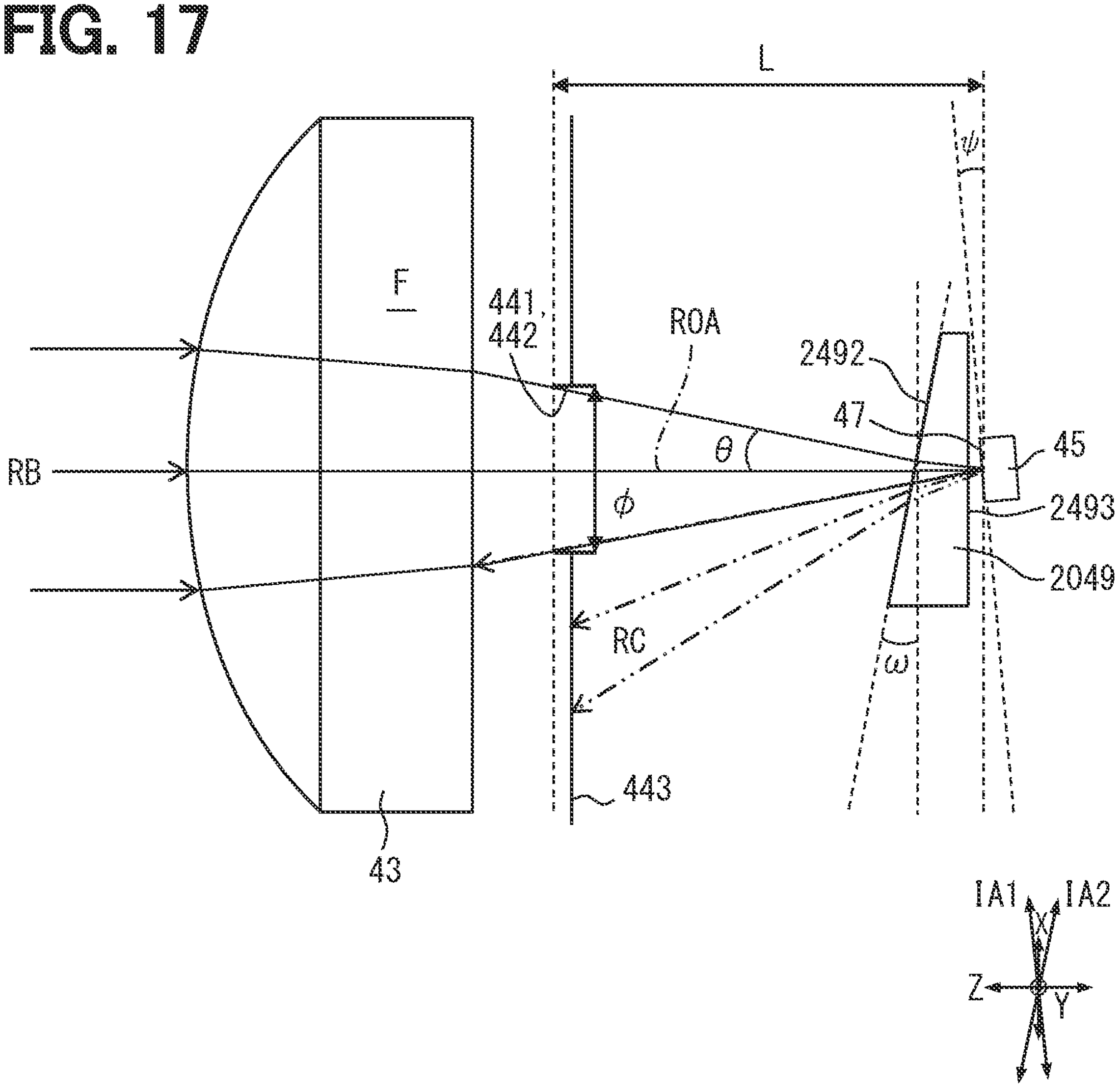
FIG. 17 is an enlarged schematic view illustrating a reception unit according to the third embodiment.
Figure 18:
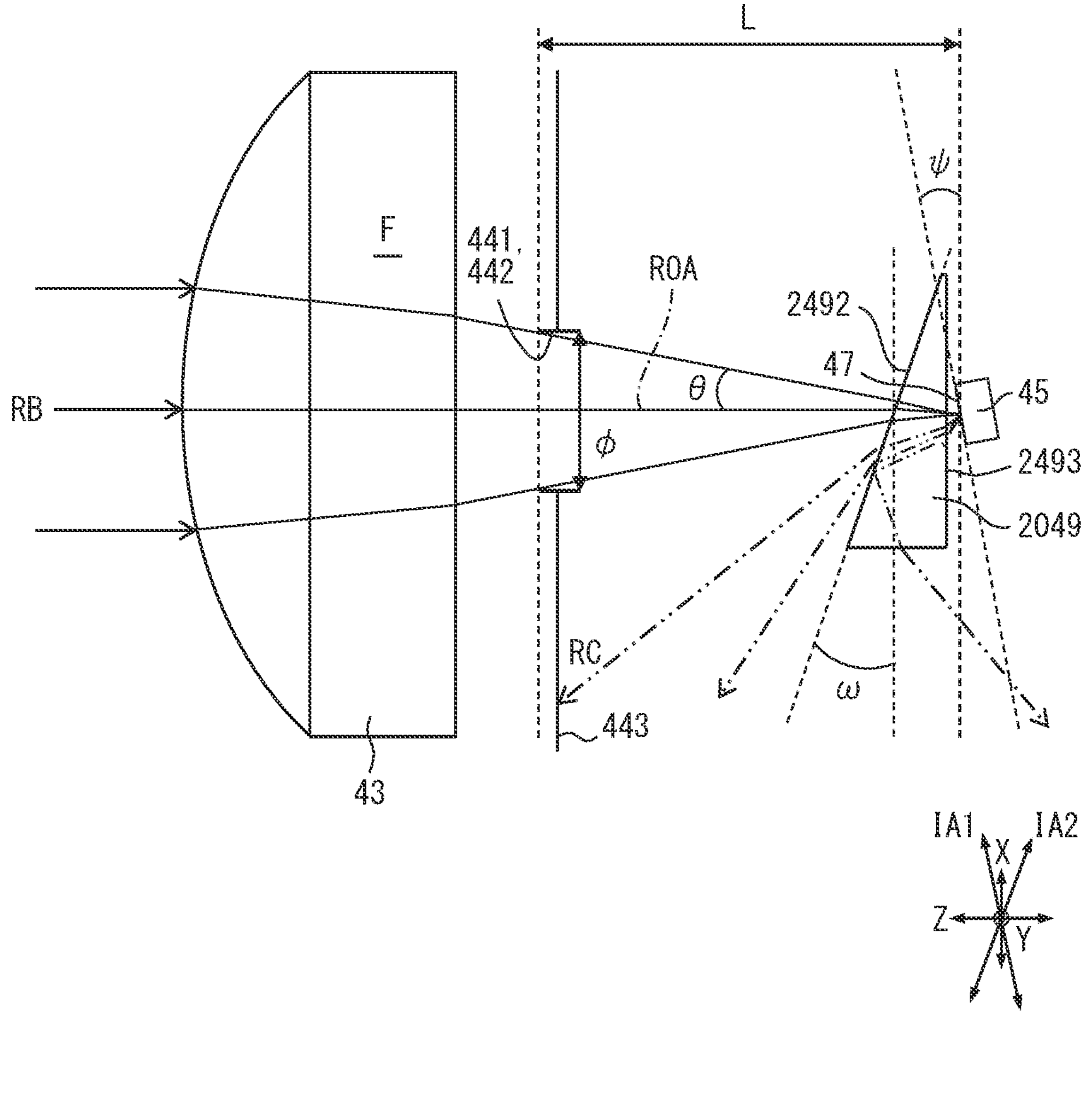
FIG. 18 is an enlarged schematic view illustrating a reception unit according to the third embodiment.
Figure 19:
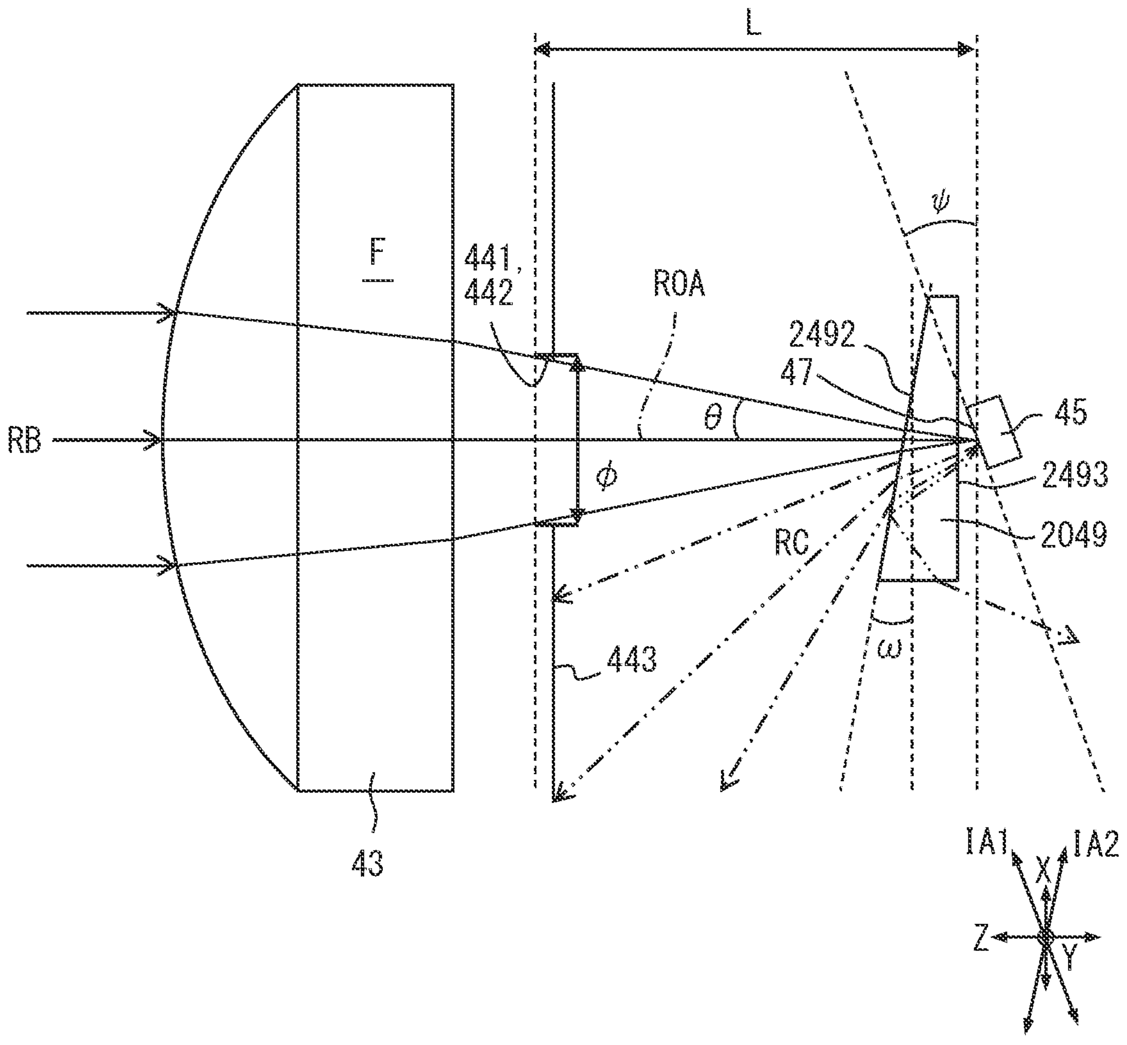
FIG. 19 is an enlarged schematic view illustrating a reception unit according to the third embodiment.

As shown in FIGS. 13 to 15, a reception unit 3041 of the third embodiment includes a light receiver 45 having an inclined reception surface 47 and a reception prism 2049 having an inclined incident surface 2492. As shown in FIGS. 14 and 15, in the cross section perpendicular to the Y axis and on the reception optical axis ROA, the reception surface 47 having the inclined axis IA1 is inclined to approach the reception optical axis ROA, and the incident surface 2492 having the inclined axis IA2 is inclined to approach the reception optical axis ROA. The inclination direction is different between the reception surface 47 and the incident surface 2492, relative to both sides through the reception optical axis ROA in the X direction. That is, the reception surface 47 and the incident surface 2492 are inclined in opposite directions around the Y axis which is the first reference axis with respect to the X axis which is the second reference axis.

As shown in FIGS. 15 to 19, the inclination angle iv of the reception surface 47 to approach the reception optical axis ROA from the X axis, and the inclination angle $\omega$ of the incident surface 2492 to approach the reception optical axis ROA from the X axis are set to the same or different magnitudes. In the third embodiment, the inclination angle $\omega$ may be set to an acute angle within a range equal to or greater than the maximum angle $\theta$ of Formula 1 defined in the first embodiment.

When it is assumed that the inclination angle $\psi$, $\omega$ is set to be equal to or less than a predetermined upper limit angle, both of the inclination angles $\psi$ and $\omega$ are set to be the upper limit angle in FIG. 15. One of the inclination angles $\psi$ and $\omega$ is set less than the upper limit angle in FIGS. 16 and 17. The retroreflection component RC is more likely to deviate from the reception optical axis ROA in FIG. 15, compared with in FIGS. 16 and 17. Assuming that the inclination angle $\psi$ is set to a predetermined fixed angle, the retroreflection component RC is more likely to deviate from the reception optical axis ROA as the inclination angle $\omega$ increases in the order of FIGS. 16, 15, and 18. Assuming that the inclination angle $\omega$ is set to a predetermined fixed angle, the retroreflection component RC is more likely to deviate from the reception optical axis ROA as the inclination angle $\psi$ increases in the order of FIGS. 17, 15, and 19.

The effects of the third embodiment will be described below.

According to the third embodiment, each of the reception surface 47 of the light receiver 45 and the incident surface 2492 of the reception prism 2049 is inclined around the Y axis serving as the first reference axis which is along the long side of the reception aspect ratio RR on the reception surface 47. Accordingly, it is possible to suppress imaging blur in the short side of the reception aspect ratio RR on the reception surface 47, which intersects the X axis as the second reference axis. Therefore, it is possible to improve the effect of suppressing the deterioration of the detection resolution due to the imaging blur, and thus the detection accuracy.

Fourth Embodiment

A fourth embodiment is a modification of the third embodiment.

Figure 20:
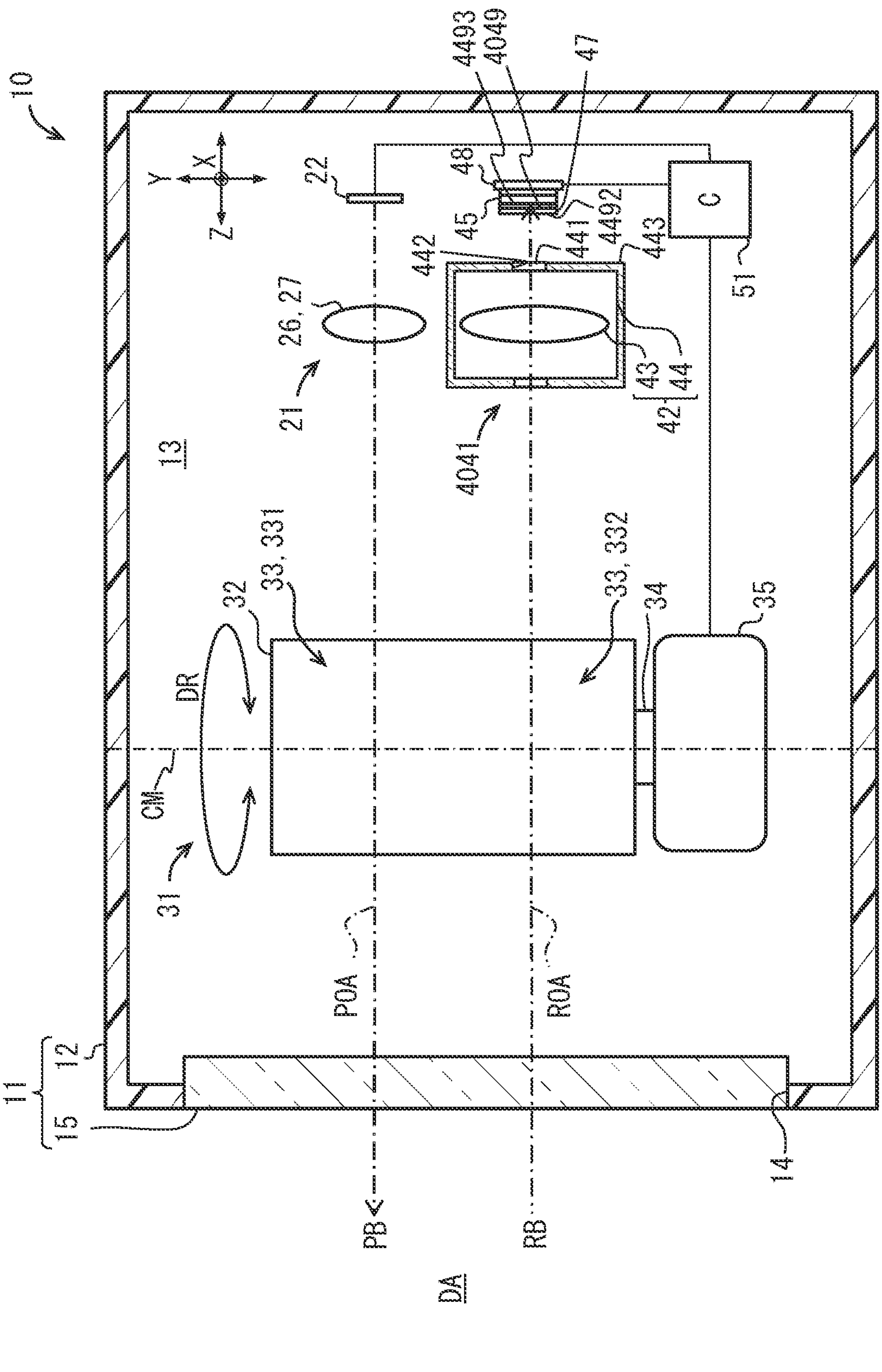
FIG. 20 is a schematic diagram illustrating a light detecting device according to a fourth embodiment.
Figure 21:
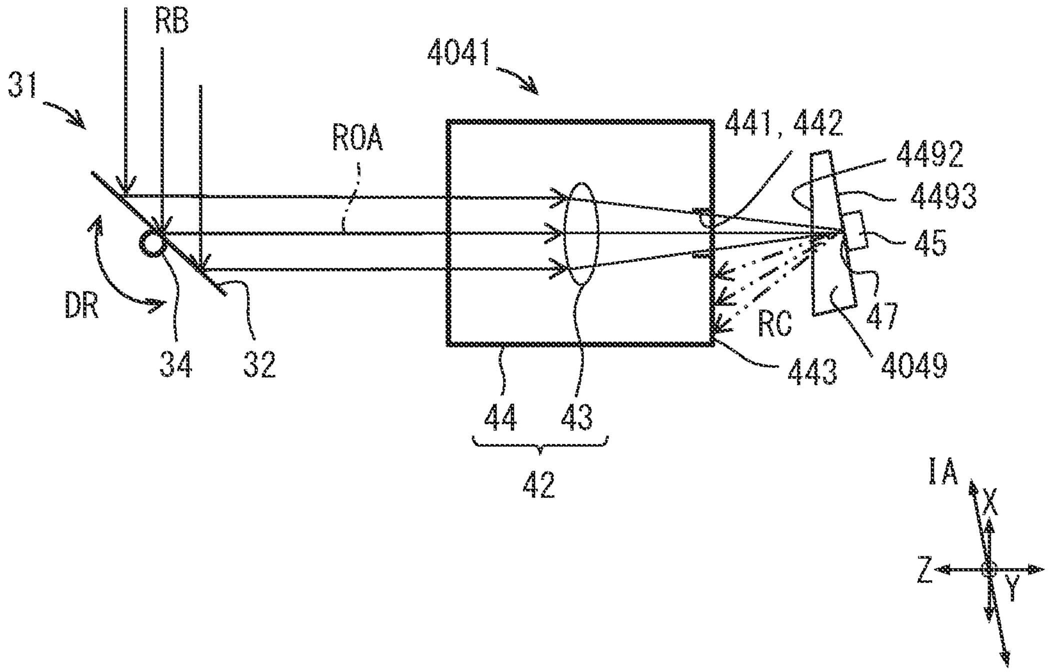
FIG. 21 is a schematic view illustrating a scanning unit and a reception unit according to the fourth embodiment.
Figure 22:
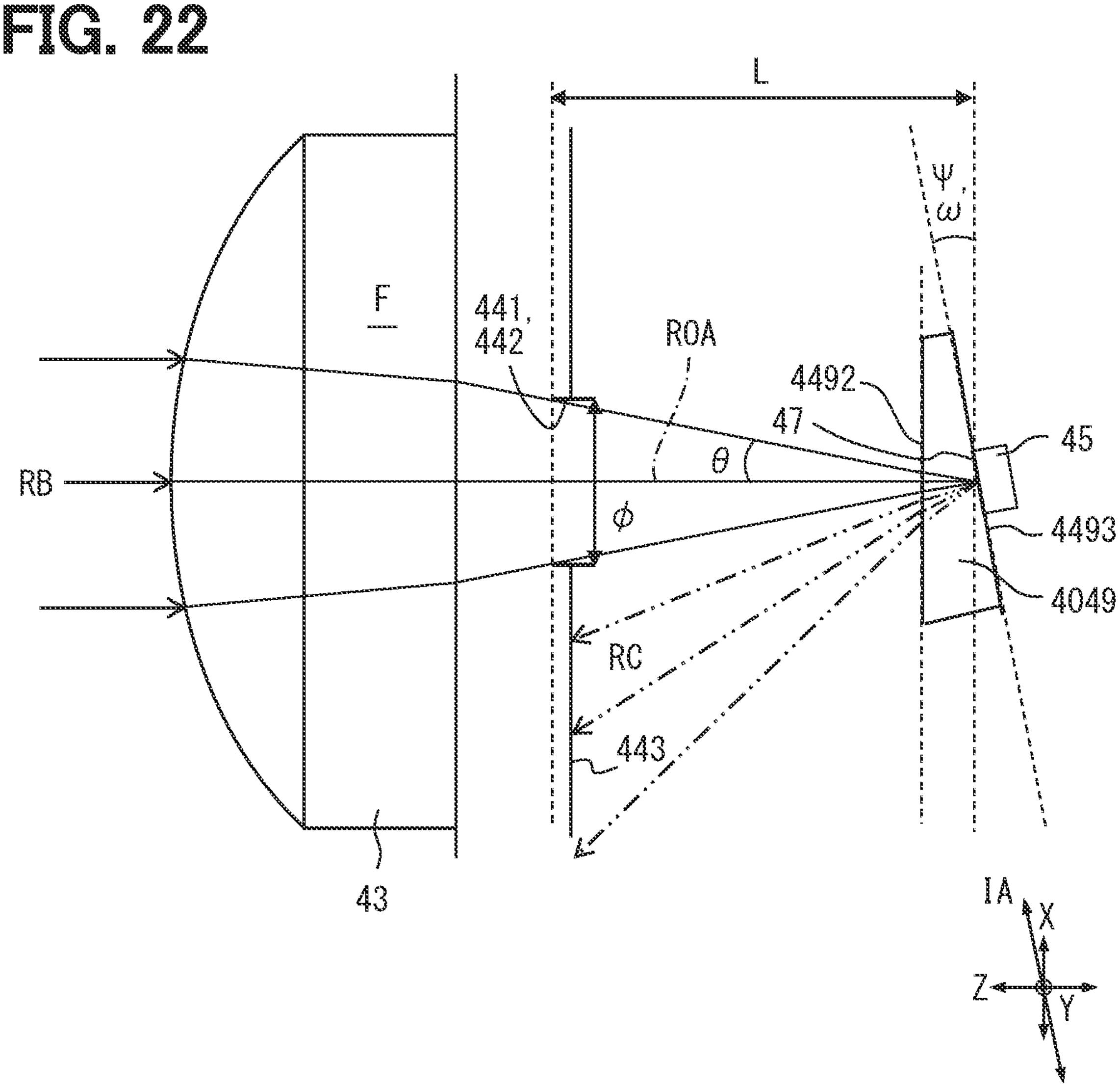
FIG. 22 is an enlarged schematic view illustrating a reception unit according to the fourth embodiment.

As shown in FIGS. 20 to 22, a reception unit 4041 of the fourth embodiment includes a reception prism 4049 corresponding to the reception prism 2049 rotated around the Y axis. In the reception prism 4049, the substantially planar incident surface 4492 is disposed in a posture substantially orthogonal to the reception optical axis ROA along the Z axis. Thus, unlike the reception surface 47 of the light receiver 45, the incident surface 4492 extends in the Y direction and the X direction.

As shown in FIGS. 21 and 22, in the reception prism 4049, the substantially planar emission surface 4493 that is not parallel to the incident surface 4492 is disposed in a posture spreading in the setting direction of the inclined axis IA and the Y direction. Accordingly, the posture of the emission surface 4493 is inclined around the Y axis as the first reference axis along the long side of the reception aspect ratio RR with respect to the X axis as the second reference axis, which intersects the short side of the reception aspect ratio RR on the reception surface 47 to be the setting direction of the inclined axis IA.

As shown in FIGS. 21 and 22, in the cross section perpendicular to the Y axis and on the reception optical axis ROA, the reception surface 47 having the inclined axis IA inclined to approach the reception optical axis ROA and the emission surface 4493 having the inclined axis IA, common to the reception surface 47, inclined to approach the reception optical axis ROA coincide with each other, of both sides through the reception optical axis ROA in the X direction. That is, the reception surface 47 and the emission surface 4493 are inclined in the same direction around the Y axis which is the first reference axis, with respect to the X axis which is the second reference axis.

Figure 23:
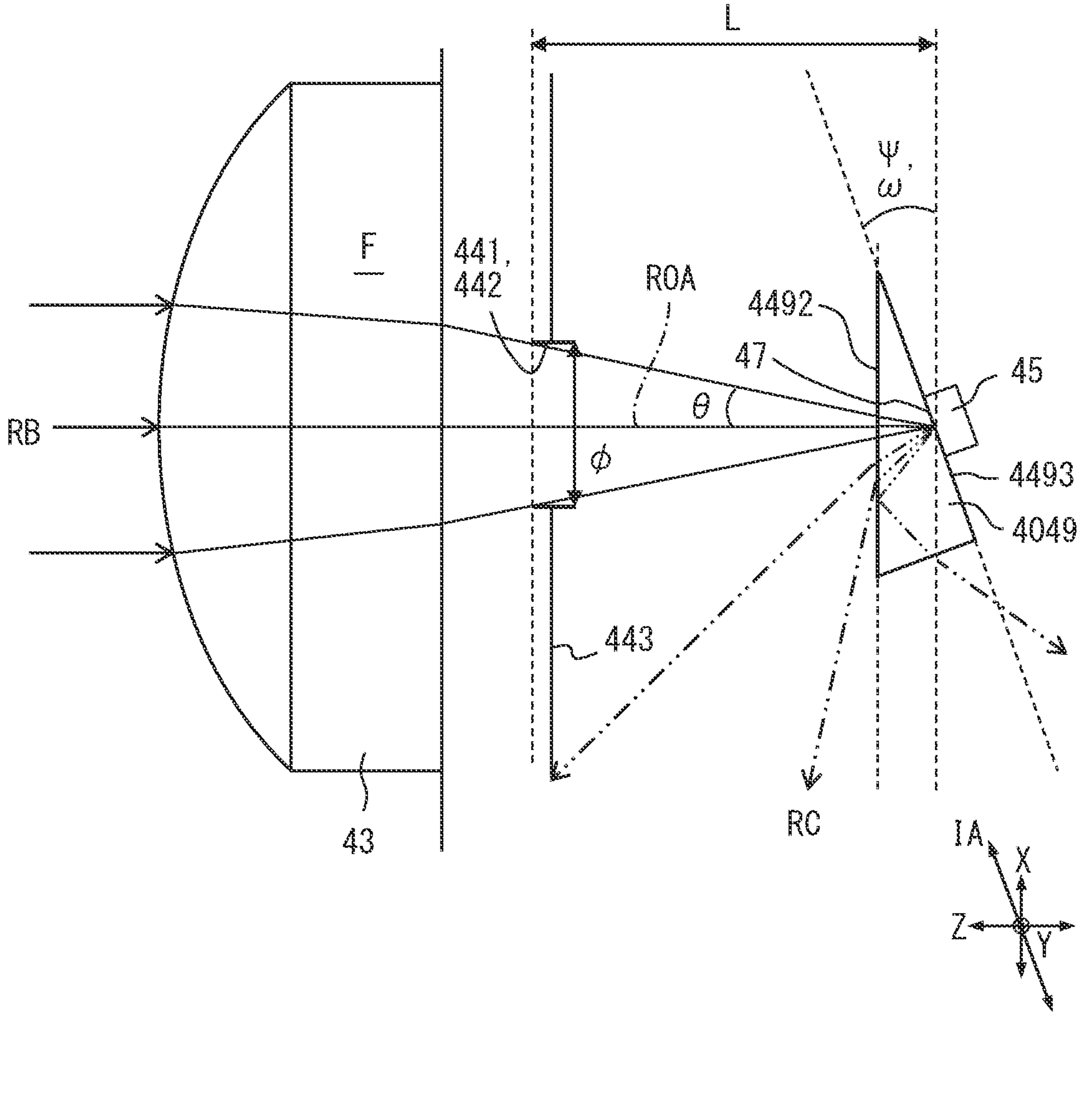
FIG. 23 is an enlarged schematic view illustrating a reception unit according to the fourth embodiment.

The inclination angle ψ of the reception surface 47 to approach the reception optical axis ROA from the X axis and the inclination angle ω of the emission surface 4493 to approach the reception optical axis ROA from the X axis are set to the same or different magnitudes as shown in FIGS. 22 and 23. In the fourth embodiment, the inclination angle ψ, ω may be set to an acute angle within a range equal to or greater than the maximum angle θ of Formula 1 defined in the first embodiment. The emission surface 4493 having the inclination angle ω which is the same angle as the inclination angle ψ of the reception surface 47 may be disposed to overlap the reception surface 47. The emission surface 4493 may be disposed to overlap the reception surface 47 directly or indirectly via a cover glass covering the reception surface 47. The emission surface 4493 having such an overlapping arrangement may be integrated with the light receiver 45 by, for example, being directly bonded to the reception surface by a translucent optical adhesive or being indirectly bonded to the reception surface 47 via an optical adhesive and a cover glass of the reception surface 47. The reception prism 4049 may be held directly by the light shielding case 12, which is a member different from the reception prism, or indirectly by the light shielding case 12 via a further member to maintain the arrangement posture in which the emission surface 4493 overlaps the reception surface 47. The reception prism 4049 itself may constitute a cover glass of the reception surface 47.

The effects of the fourth embodiment will be described below.

According to the fourth embodiment, the reception surface 47 of the light receiver 45 and the emission surface 4493 of the reception prism 4049 are inclined around the Y axis serving as the first reference axis along which the long side of the reception aspect ratio RR on the reception surface 47 extends. Accordingly, it is possible to suppress imaging blur in the short side of the reception aspect ratio RR on the reception surface 47, which intersects the X axis as the second reference axis. Therefore, it is possible to improve the effect of suppressing the deterioration of the detection resolution due to the imaging blur, and thus the detection accuracy.

OTHER EMBODIMENTS

Although the embodiments have been described above, the present disclosure is not to be construed as being limited to these embodiments, and can be applied to various embodiments and combinations within a scope not deviating from the gist of the present disclosure.

In a modification, the laser oscillation elements 24 of the projection window 25 may be arranged in plural rows along the X direction and arranged in a row along the Y direction. In a modification, the reception pixels 46 of the reception surface 47, 2047 may be arranged in plural rows along the setting direction of the inclined axis IA or the X direction and arranged in a row along the Y direction.

In a modification, the rotation shaft 34 of the scanning mirror 32 may be disposed to have the rotation center line CM in a direction intersecting the Y axis, such as two axes other than the Y axis in the three-dimensional orthogonal coordinate system. In a modification, the relationship between the three directions of the three-dimensional orthogonal coordinate system and the vehicle may be appropriately defined according to, for example, the arrangement position of the light detecting device 10.

In a modification, the lens barrel 44 may be integrally formed with the housing 11 as a part of the light shielding case 12. In a modification, at least one of the aperture stop 442 and the light absorbing surface 443 may not be provided in the lens barrel 44.

In a modification, the reception prism 2049, 4049 may be held by the lens barrel 44 while being located between the single or last reception lens 43 of the reception optical system 42 and the reception surface 47, 2047 of the light receiver 45, 2045. In this case, the reception prism 2049, 4049 may be a part of the reception optical system 42.

Figure 24:
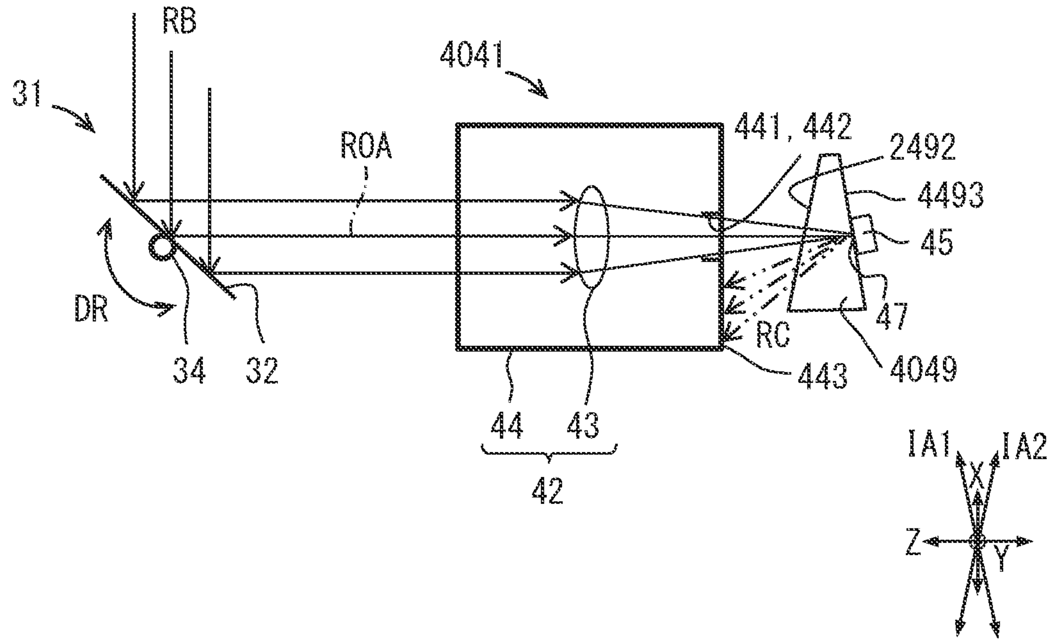
FIG. 24 is a schematic diagram illustrating a scanning unit and a reception unit according to a modification.

As shown in FIG. 24, in a modification, the incident surface 2492 inclined around the Y axis relative to the X axis, according to the second and third embodiments, may be applied to the reception prism 4049 of the fourth embodiment. In this case, in the cross section perpendicular to the Y axis and on the reception optical axis ROA, of both sides through the reception optical axis ROA in the X direction, the reception surface 47 and the emission surface 4493 along the inclined axis IA1, which are inclined to approach the reception optical axis ROA, may be different from the incident surface 2492 along the inclined axis IA2 to approach the reception optical axis ROA, as shown in FIG. 24, or coincide with the incident surface 2492.

Figure 25:
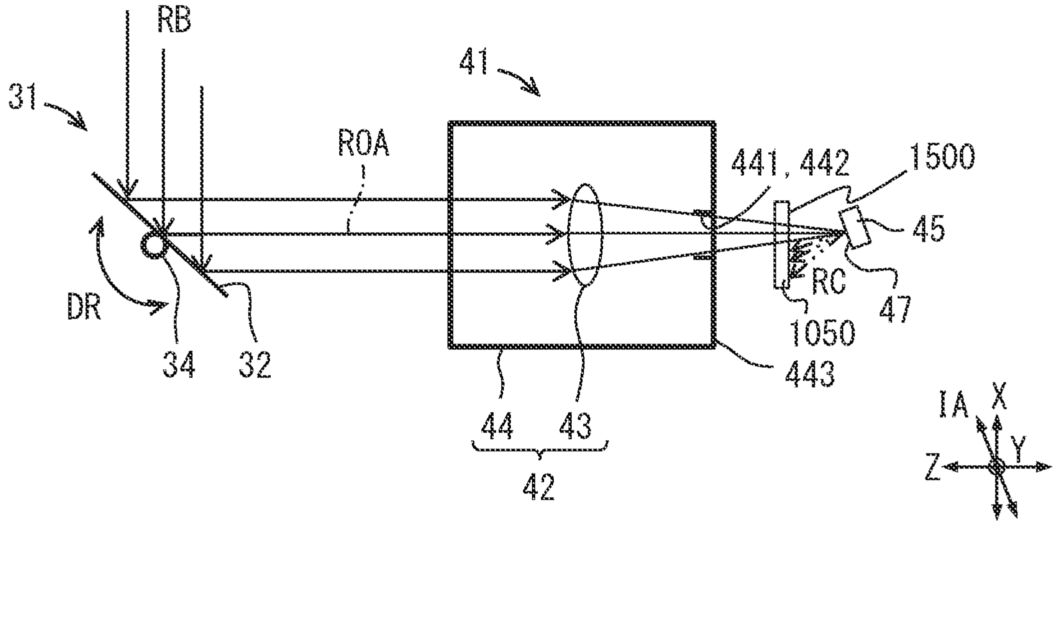
FIG. 25 is a schematic view illustrating a scanning unit and a reception unit according to a modification.

As shown in FIG. 25 corresponding to the first embodiment, in a modification of the reception unit 41, 2041, 3041, and 4041, a flat-plate-shaped reflective optical filter 1500 such as a band pass filter in the near infrared region may be disposed between the single or rearmost reception lens 43 of the reception optical system 42 and the reception surface 47, 2047 of the light receiver 45, 2045.

What is claimed is:

1. A light detecting device configured to scan a projection beam toward a detection area and detect a reflected beam from the detection area, the light detecting device comprising:

a reception optical system configured to guide the reflected beam along a reception optical axis;

a light receiver configured to output a detection signal by receiving the reflected beam through the reception optical system; and a reception prism configured to refract the reflected beam in front of the light receiver, wherein the light receiver forms a reception surface having a reception aspect ratio in which a long side extends along a first reference axis orthogonal to the reception optical axis, the reception surface is disposed in a posture inclined around the first reference axis with respect to a second reference axis orthogonal to the reception optical axis and the first reference axis, the reception prism has an optical surface disposed in a posture inclined around the first reference axis with respect to the second reference axis, and the optical surface is formed by an incident surface or/and an emission surface of the reception prism, the reception optical system includes a reception lens configured to focus the reflected beam on the light receiver, the reception optical system includes a lens barrel housing the reception lens, and the lens barrel forms a light absorbing surface around an exit port of the lens barrel adjacent to the light receiver so as to absorb a retroreflection component of the reflected beam.

2. A light detecting device configured to scan a projection beam toward a detection area and detect a reflected beam from the detection area, the light detecting device comprising:

a reception optical system configured to guide the reflected beam along a reception optical axis;

a light receiver configured to output a detection signal by receiving the reflected beam through the reception optical system; and a reception prism configured to refract the reflected beam in front of the light receiver, wherein the light receiver forms a reception surface having a reception aspect ratio in which a long side extends along a first reference axis orthogonal to the reception optical axis, the reception prism has an optical surface disposed in a posture inclined around the first reference axis with respect to a second reference axis orthogonal to the reception optical axis and the first reference axis, and the optical surface is formed by an incident surface or/and an emission surface of the reception prism, the reception optical system includes a reception lens configured to focus the reflected beam on the light receiver, the reception optical system includes a lens barrel housing the reception lens, and the lens barrel forms a light absorbing surface around an exit port of the lens barrel adjacent to the light receiver so as to absorb a retroreflection component of the reflected beam.

3. The light detecting device according to claim 2, wherein the reception prism is bonded at the reception surface or held by a member different from the reception prism.

4. The light detecting device according to claim 2, wherein the reception surface includes a plurality of reception pixels arranged in a single row along the first reference axis.

5. The light detecting device according to claim 2, further comprising a scanning mirror configured to scan the projection beam toward the detection area and reflect the reflected beam toward the reception optical system, wherein the reception optical system guides the reflected beam along the reception optical axis over a driving range of the scanning mirror which is rotationally driven around a rotation center line along the first reference axis.

6. The light detecting device according to claim 5, further comprising a light projector configured to emit the projection beam toward the scanning mirror, wherein the light projector forms a projection window having a projection aspect ratio in which a long side extends along the first reference axis.

7. The light detecting device according to claim 2, wherein the lens barrel forms an aperture stop to narrow an exit port adjacent to the light receiver.

8. A light detecting device configured to scan a projection beam toward a detection area and detect a reflected beam from the detection area, the light detecting device comprising:

a reception optical system configured to guide the reflected beam along a reception optical axis;

a light receiver configured to output a detection signal by receiving the reflected beam through the reception optical system; and a reception prism configured to refract the reflected beam in front of the light receiver, wherein the light receiver forms a reception surface having a reception aspect ratio in which a long side extends along a first reference axis orthogonal to the reception optical axis, the reception surface is disposed in a posture inclined around the first reference axis with respect to a second reference axis orthogonal to the reception optical axis and the first reference axis, the reception prism has an optical surface disposed in a posture inclined around the first reference axis with respect to the second reference axis, and the optical surface is formed by an incident surface or/and an emission surface of the reception prism, the reception optical system includes a reception lens configured to focus the reflected beam on the light receiver, the reception optical system includes a lens barrel housing the reception lens, and the lens barrel forms an aperture stop to narrow an exit port adjacent to the light receiver.

9. A light detecting device configured to scan a projection beam toward a detection area and detect a reflected beam from the detection area, the light detecting device comprising:

a reception optical system configured to guide the reflected beam along a reception optical axis;

a light receiver configured to output a detection signal by receiving the reflected beam through the reception optical system; and a reception prism configured to refract the reflected beam in front of the light receiver, wherein the light receiver forms a reception surface having a reception aspect ratio in which a long side extends along a first reference axis orthogonal to the reception optical axis, the reception prism has an optical surface disposed in a posture inclined around the first reference axis with respect to a second reference axis orthogonal to the reception optical axis and the first reference axis, and the optical surface is formed by an incident surface or/and an emission surface of the reception prism, the reception optical system includes a reception lens configured to focus the reflected beam on the light receiver, the reception optical system includes a lens barrel housing the reception lens, and the lens barrel forms an aperture stop to narrow an exit port adjacent to the light receiver.

* * * * *